May 1, 1962  R. G. HOLMAN  3,032,337
CONTINUOUS STACKING SYSTEM
Filed May 4, 1959  17 Sheets-Sheet 3
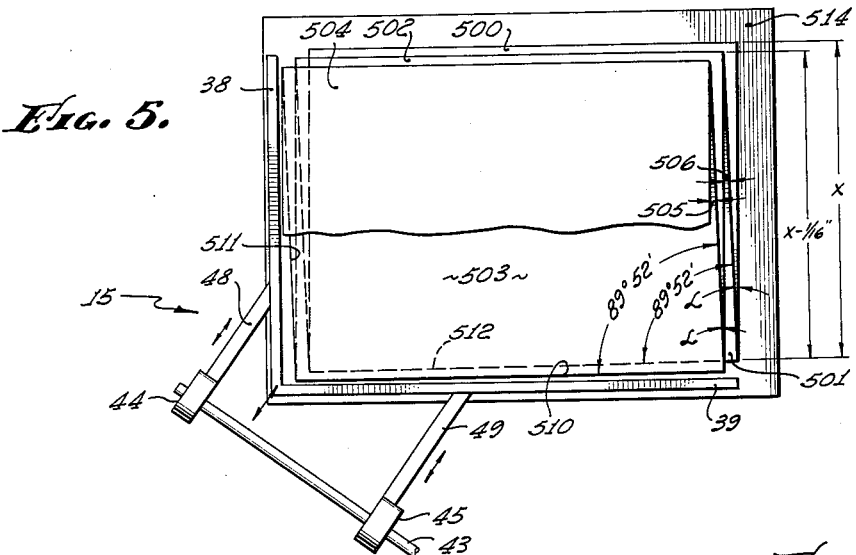
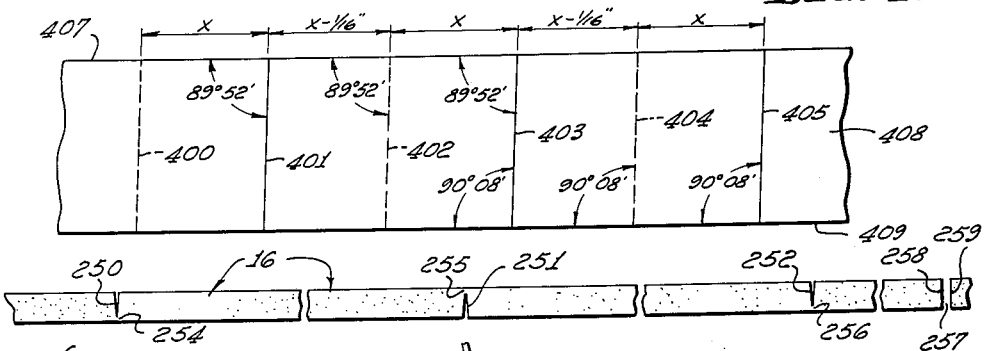
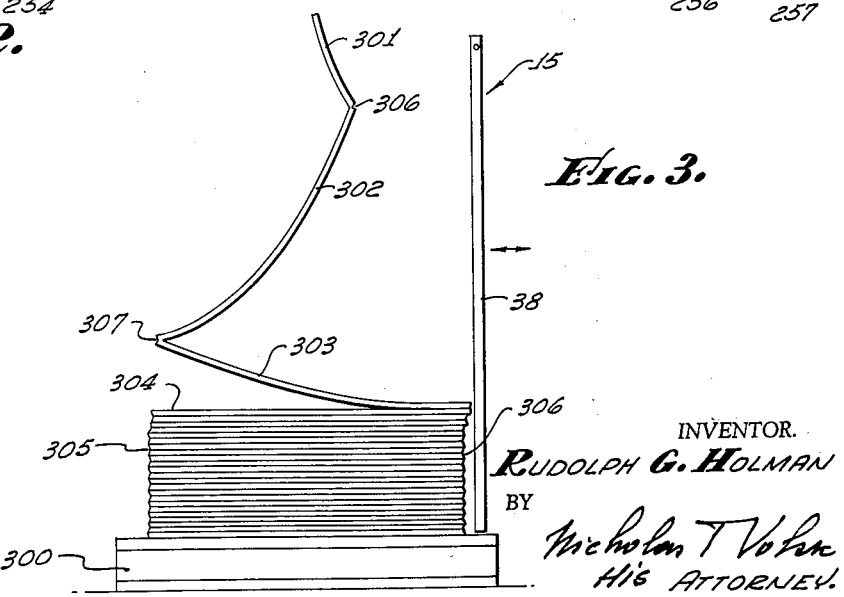
INVENTOR.
RUDOLPH G. HOLMAN
BY Nicholas T Volk
HIS ATTORNEY.

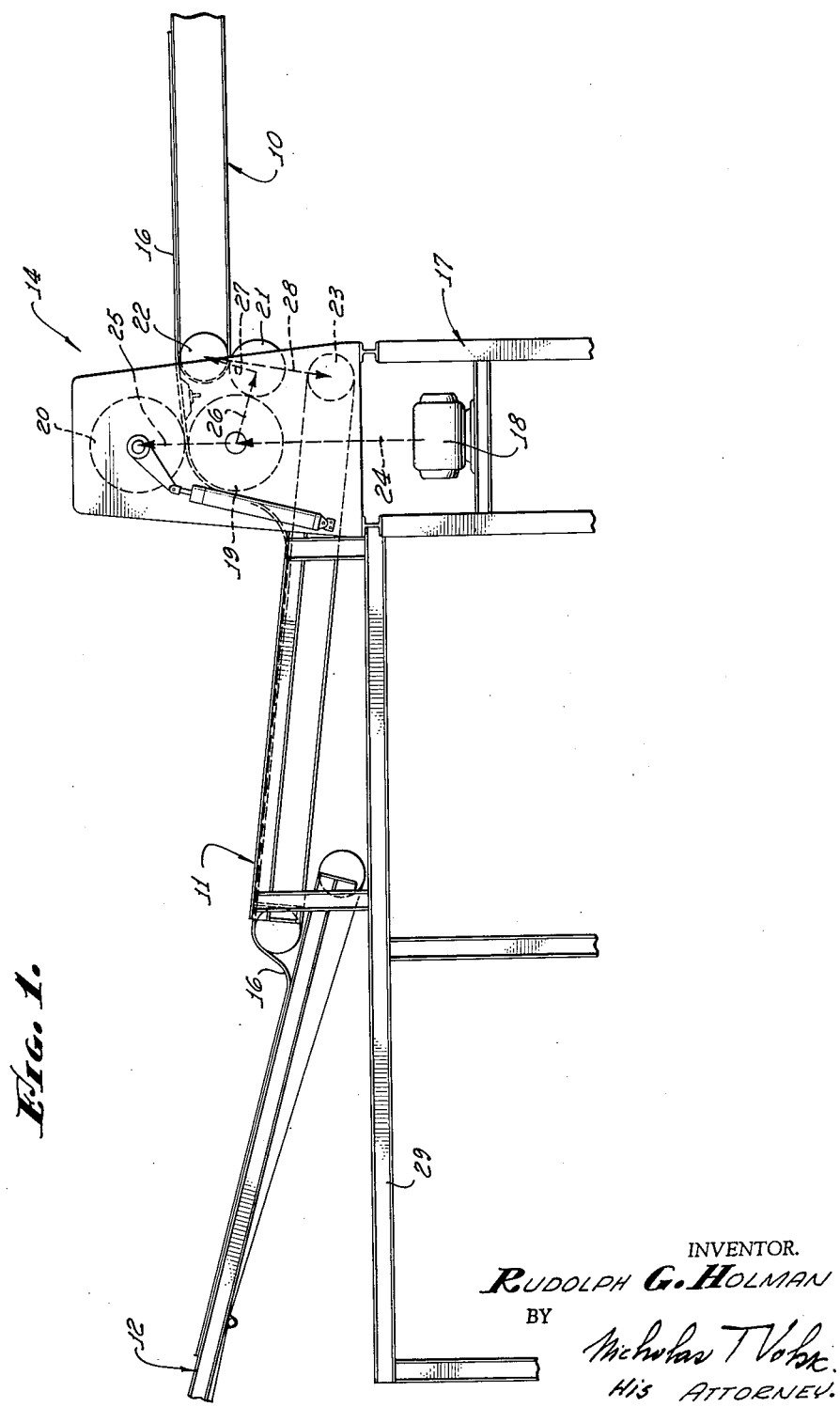

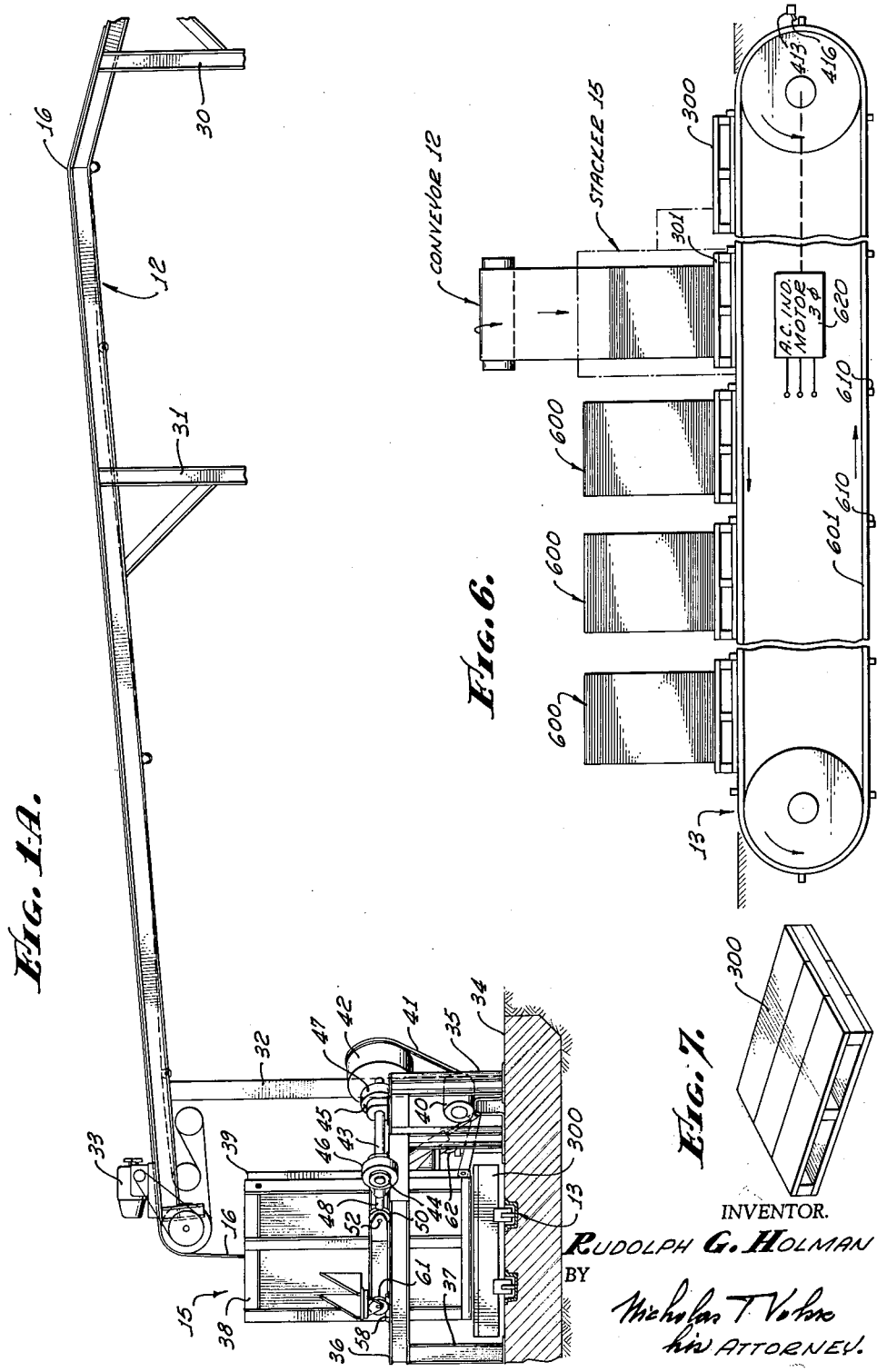

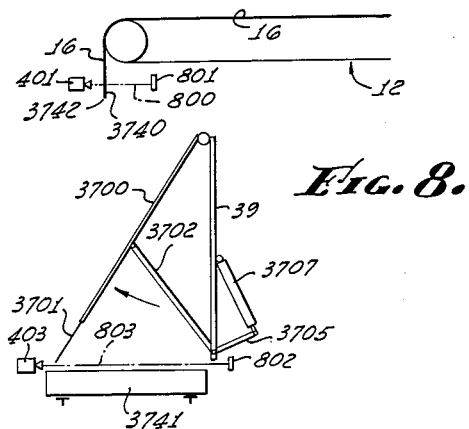
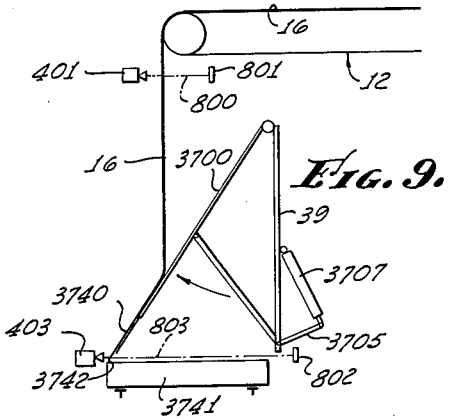
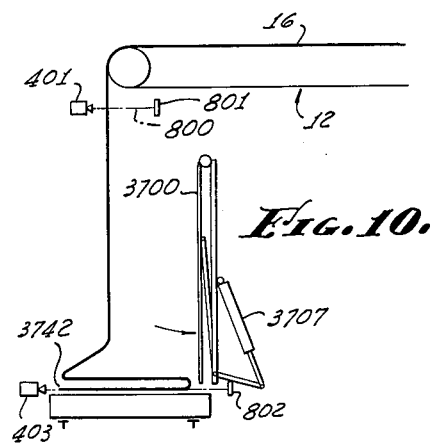
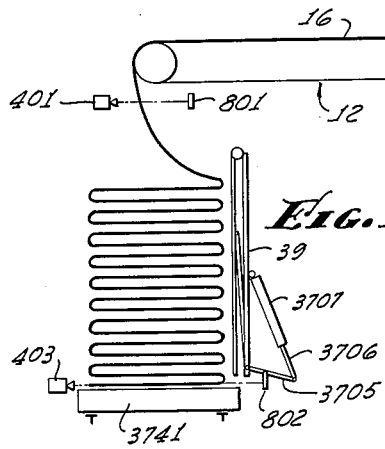
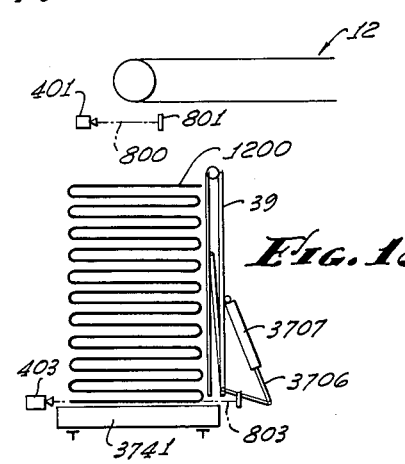
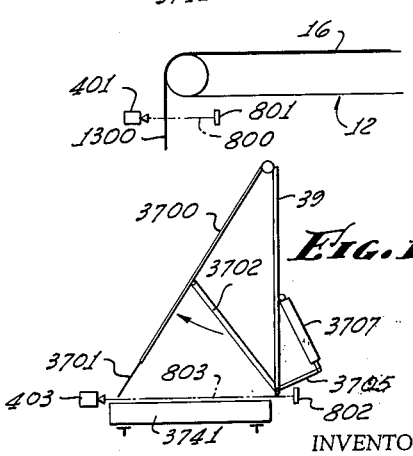
INVENTOR.
RUDOLPH G. HOLMAN
BY
Nicholas T Viak
HIS ATTORNEY.

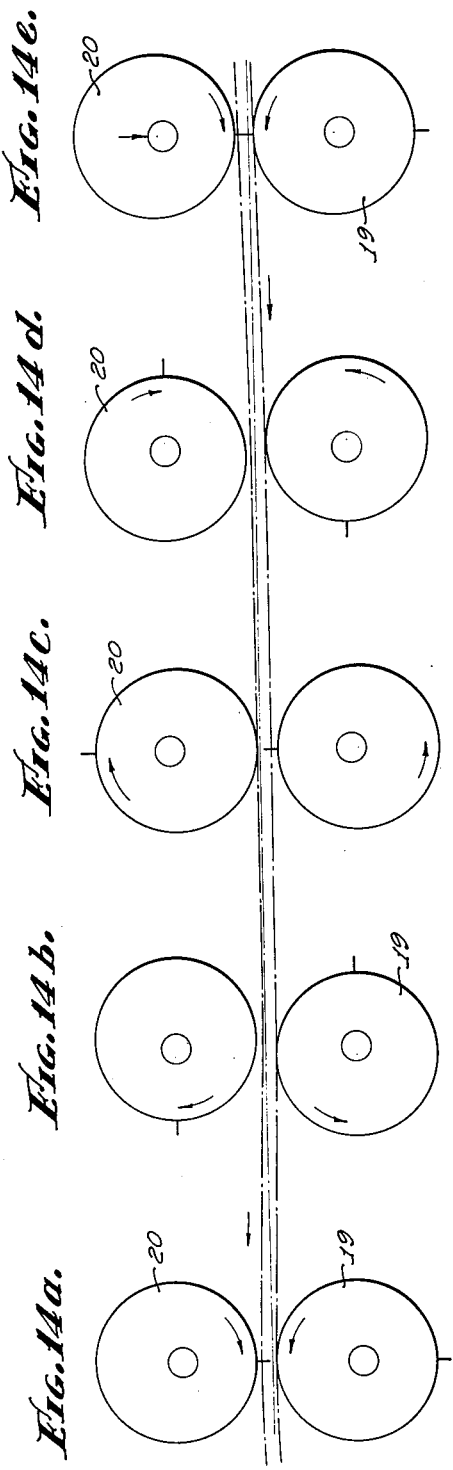

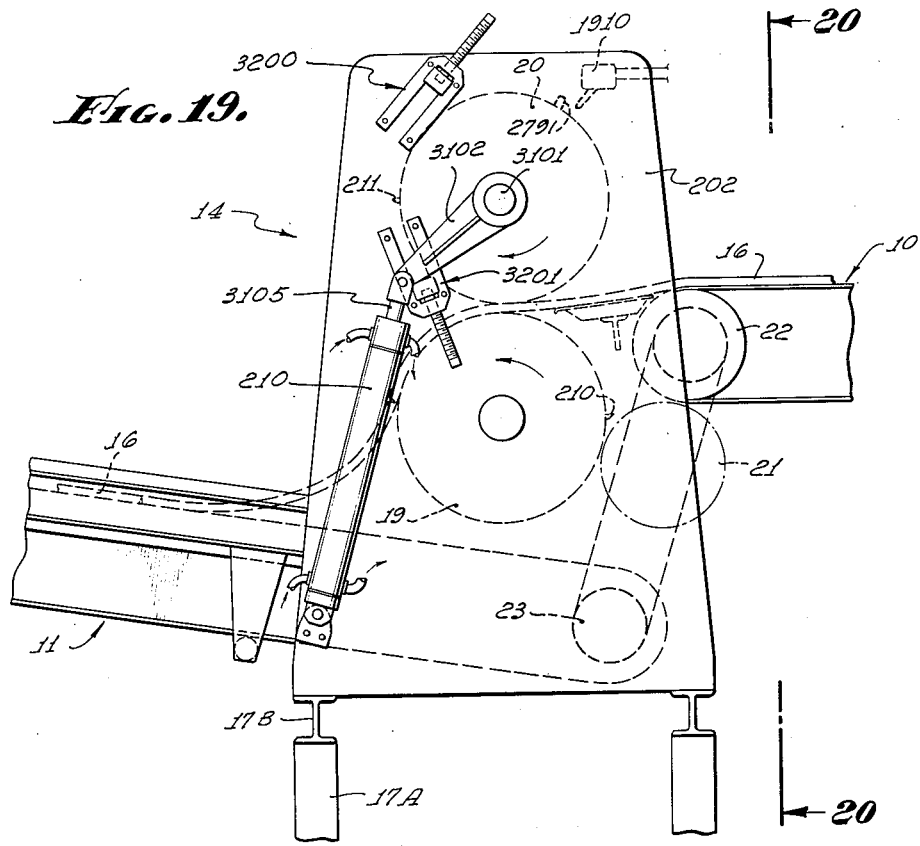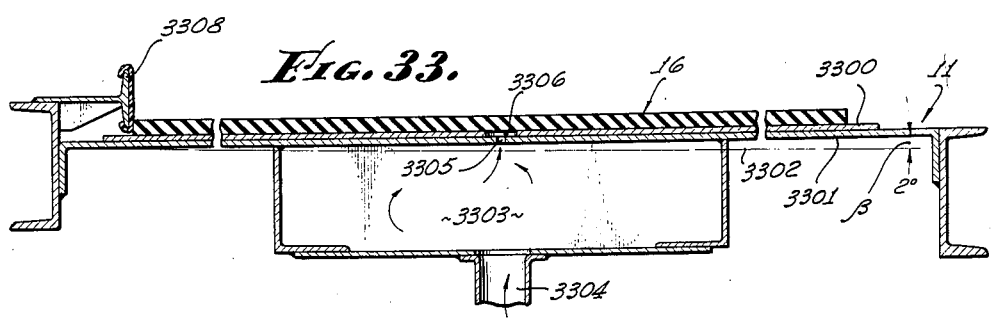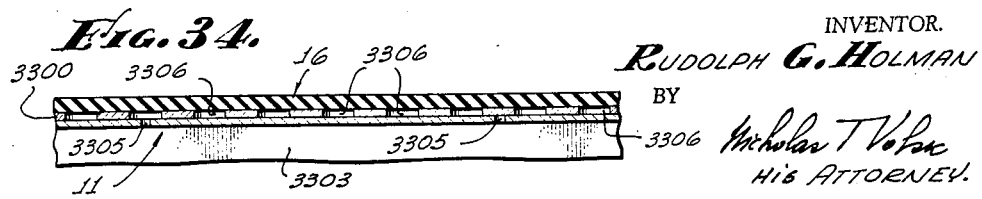

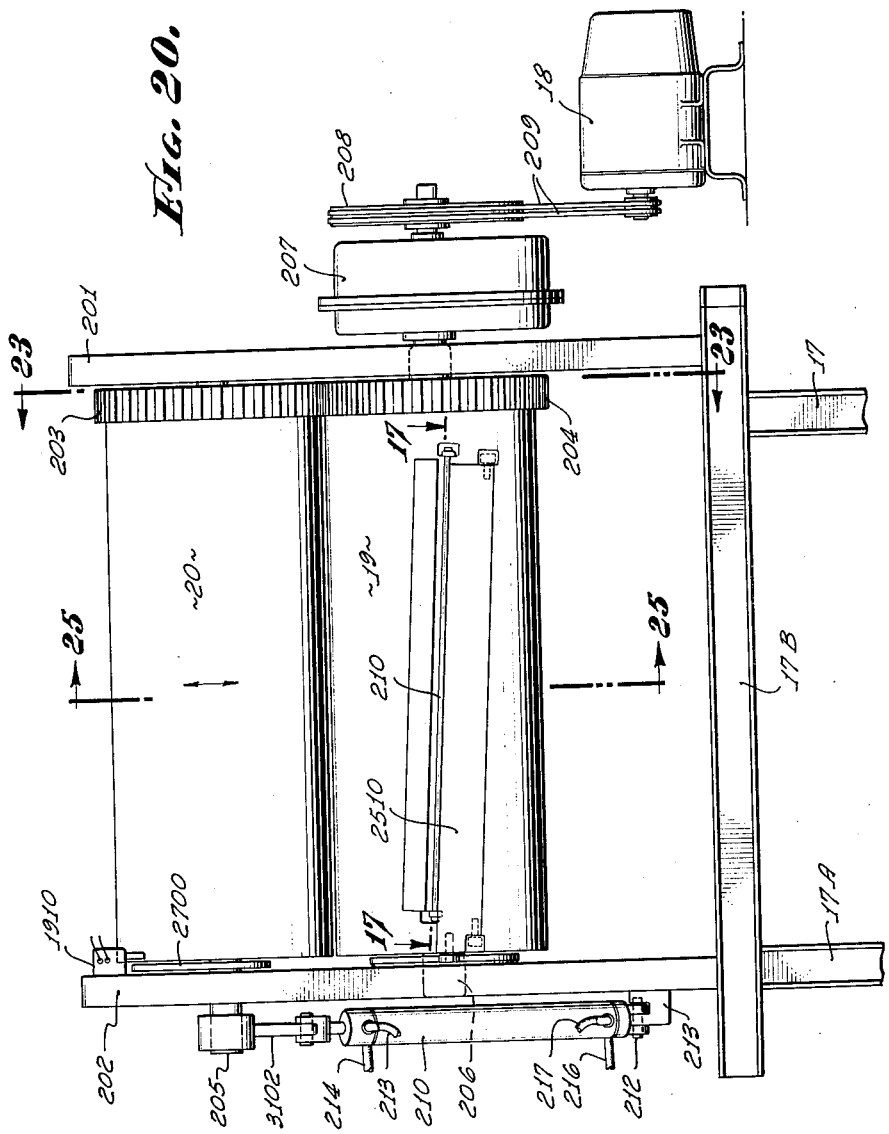

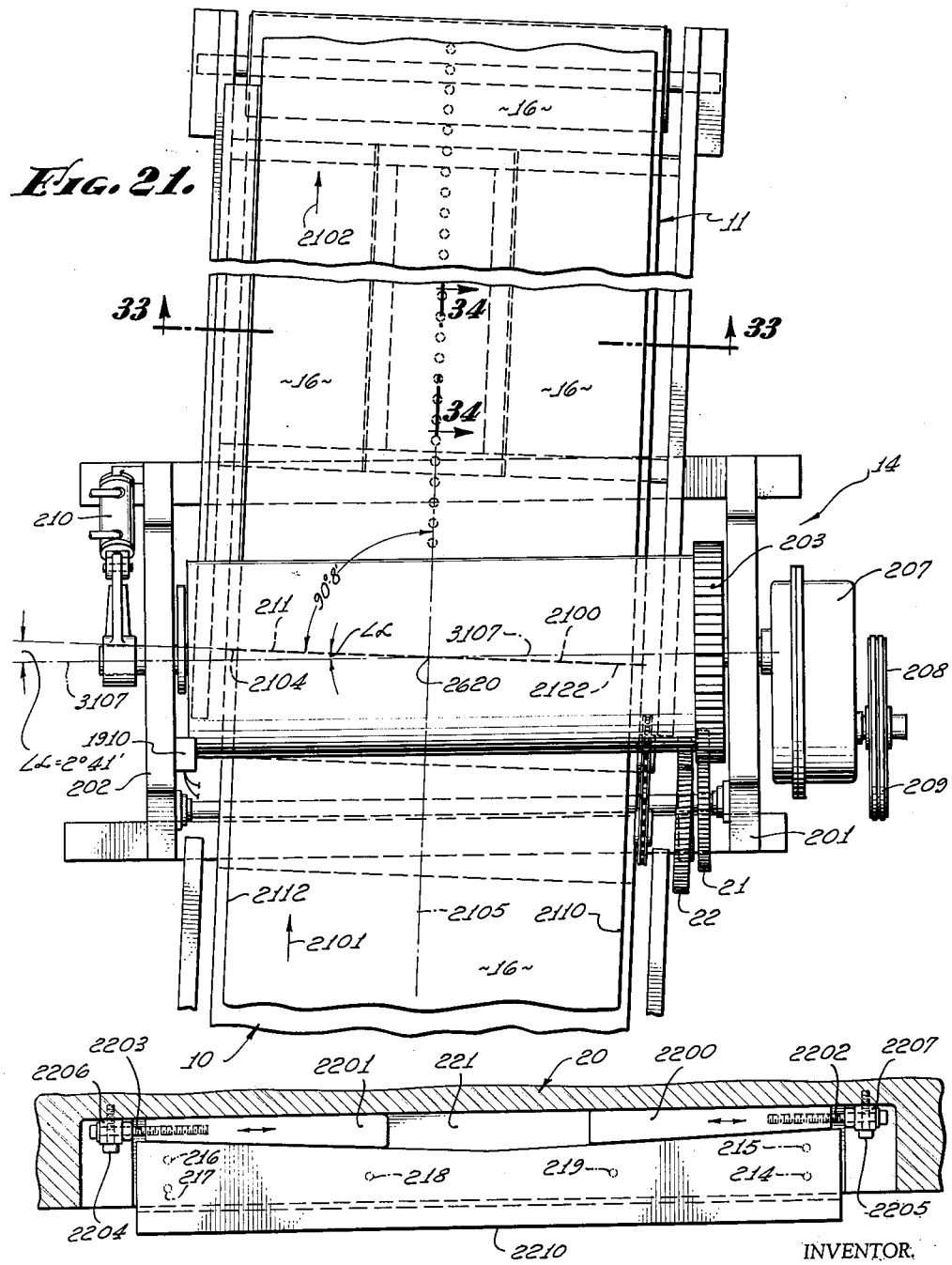

May 1, 1962 R. G. HOLMAN 3,032,337
CONTINUOUS STACKING SYSTEM
Filed May 4, 1959 17 Sheets-Sheet 9
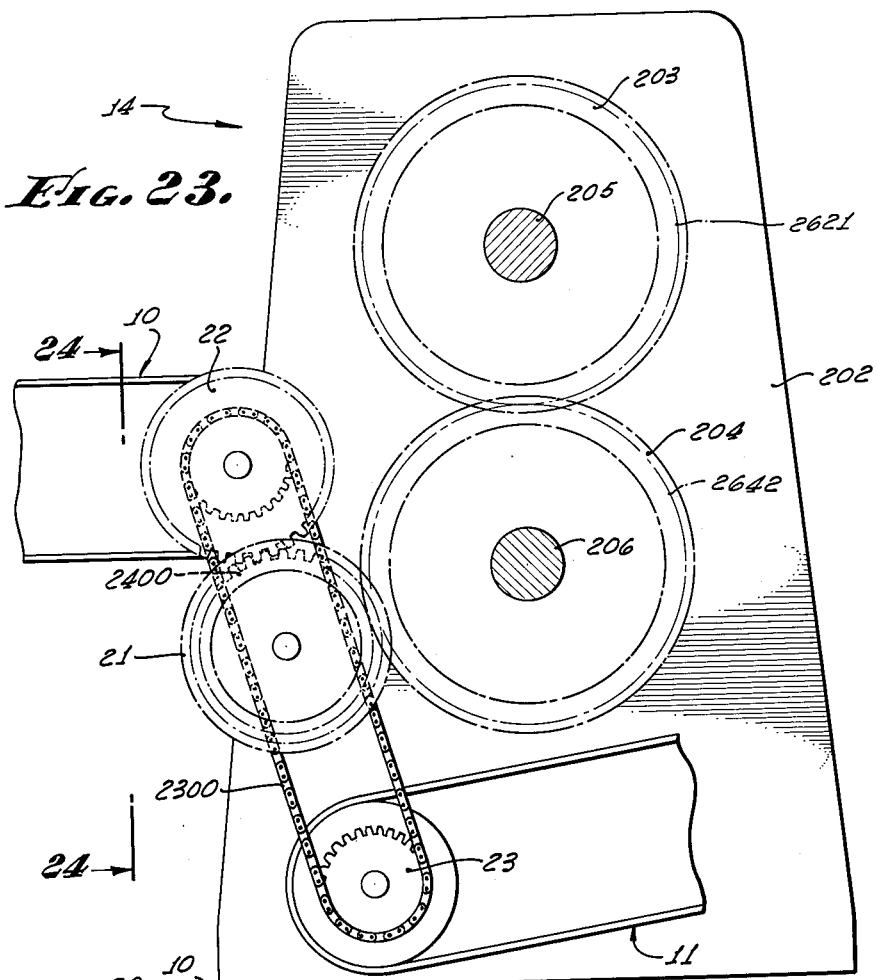
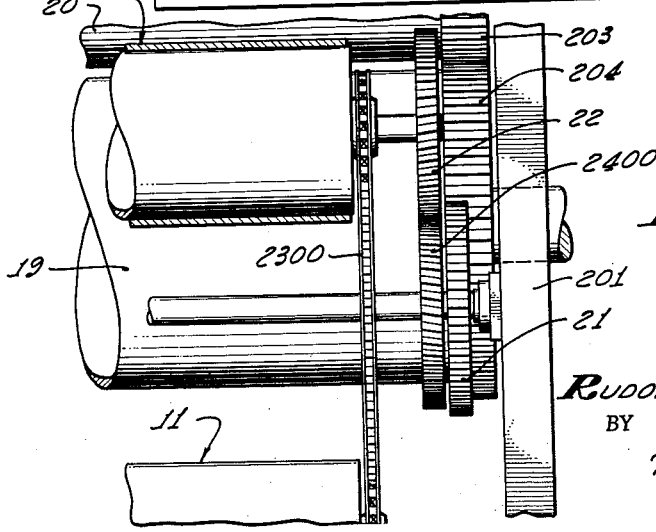
INVENTOR.
RUDOLPH G. HOLMAN
BY
Nicholas T Vohr
HIS ATTORNEY.

May 1, 1962 R. G. HOLMAN 3,032,337
CONTINUOUS STACKING SYSTEM
Filed May 4, 1959 17 Sheets-Sheet 10

INVENTOR.
RUDOLPH G. HOLMAN
BY Nicholas T Volec
His ATTORNEY.

May 1, 1962 R. G. HOLMAN 3,032,337
CONTINUOUS STACKING SYSTEM
Filed May 4, 1959 17 Sheets-Sheet 12

INVENTOR.
RUDOLPH G. HOLMAN
BY
Nicholas T Volk
ATTORNEY.

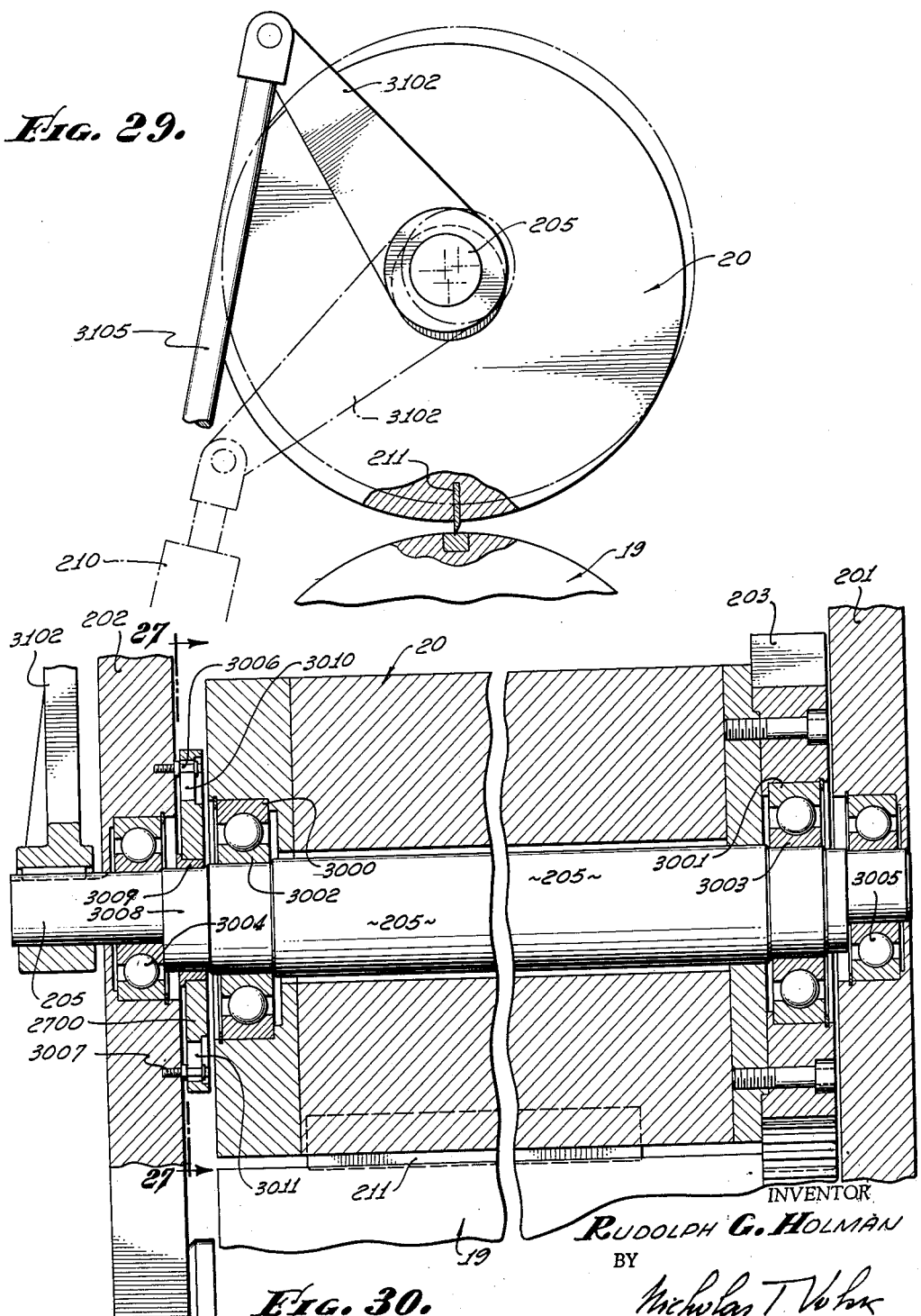

INVENTOR.
RUDOLPH G. HOLMAN
BY
Nicholas T Vohr
ATTORNEY.

May 1, 1962 R. G. HOLMAN 3,032,337
CONTINUOUS STACKING SYSTEM
Filed May 4, 1959 17 Sheets-Sheet 15

INVENTOR.
RUDOLPH G. HOLMAN
BY
Nicholas T Vohr
ATTORNEY.

May 1, 1962 R. G. HOLMAN 3,032,337
CONTINUOUS STACKING SYSTEM
Filed May 4, 1959 17 Sheets-Sheet 16

INVENTOR.
RUDOLPH G. HOLMAN
BY
Nicholas T Volk
ATTORNEY.

May 1, 1962  R. G. HOLMAN  3,032,337
CONTINUOUS STACKING SYSTEM
Filed May 4, 1959  17 Sheets-Sheet 17
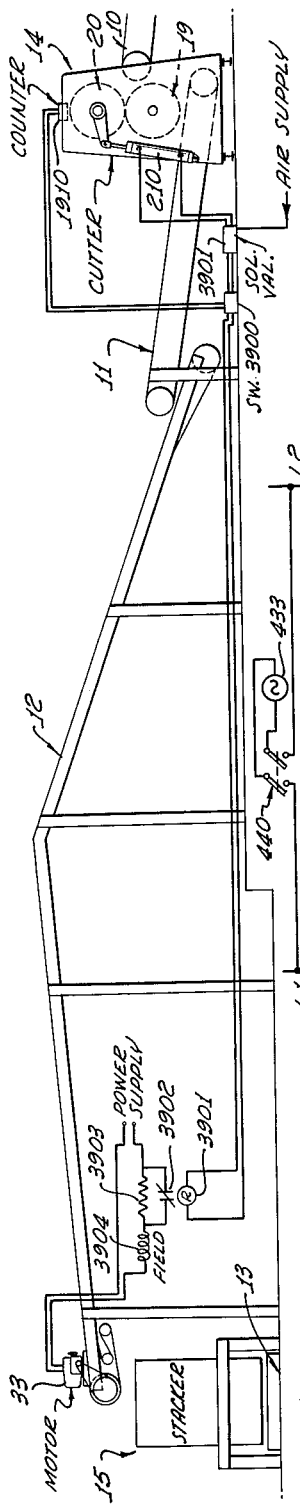
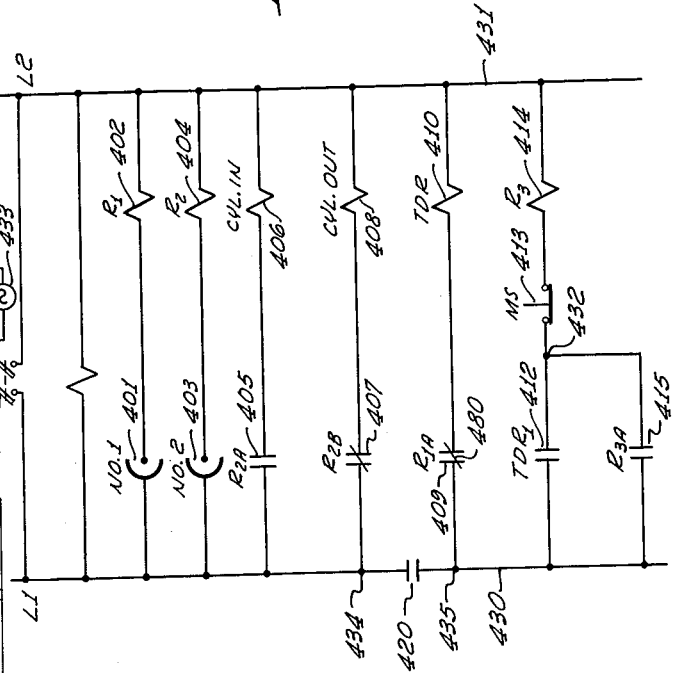
INVENTOR.
RUDOLPH G. HOLMAN
BY
Nicholas T Volk
ATTORNEY

3,032,337
CONTINUOUS STACKING SYSTEM
Rudolph G. Holman, La Habra, Calif., assignor to W. J. Voit Rubber Corp., a corporation of California
Filed May 4, 1959, Ser. No. 810,803
15 Claims. (Cl. 270—79)

This invention relates to a continuous stacking system which transforms a continuous ribbon of a plastic material into discrete stacks of slabs of such material, resting on respective pallets. The plastic material may include such materials as synthetic or natural rubber, synthetic resins, corrugated cardboard and any other kind of pliable and reasonably soft material which can be cut by revolving knives of a cutter without impairing the edges of the revolving knives.

The invention will be described by the way of an example in connection with conversion of a continuous ribbon of rubber into stacks of rectangular pieces, or slabs of rubber, the slabs being stacked, in the form of vertical piles, on top of suitable pallets which automatically are taken away from an automatic stacker by means of an appropriate conveyor.

In processing rubber, either synthetic or natural rubber, the process of obtaining stacks of slabs of crude rubber includes the following steps: raw materials are dumped into a hopper of a mixer, such as a Banbury mixer, where the raw materials are mixed by means of two elliptically shaped rollers. The material is then conveyed by gravity to a continuous screw feeder which further mixes the material and also conveys it at a relatively high pressure to a calender which generally includes a pair or more rollers transform the raw material fed into it by the screw conveyor into a sheet of rubber of constant cross-sectional area. It is this ribbon of rubber that is then conveyed to a continuous stacker disclosed in this invention which transforms this ribbon into discreet stacks of rubber slabs which are placed on the successive pallets in automatic manner. These stacks of raw rubber are subsequently reworked once more in a series of rollers and calenders which transform this stack of raw rubber again into a continuous ribbon which is more homogeneous in its structure than the raw slabs of rubber because of the additional kneading and heating imparted to these slabs of rubber in the series of calenders and rollers, which are also known as warm-up mills. For a more detailed description of the apparatus for re-kneading such slabs of rubber reference is made to the co-pending application of the same inventor Serial No. 747,069, filed July 7, 1958 (now U.S. Patent No. 2,994,913), and entitled "Method and Apparatus for Producing a Continuous Strip of Elastic Material."

In the light of the above description, it follows that the apparatus that is disclosed here is that apparatus which is used between the first calender connected to the continuous screw feeder and the pallets which receive raw rubber in the form of stacked up slabs of such raw rubber prior to its use in the warm-up mills.

As mentioned previously, it is to be understood that the disclosed apparatus is suitable for use in converting other plastic ribbons into stacked up slabs of such material, and, therefore, the described application represents no more than the specific application of this apparatus to the processing of synthetic or natural rubber.

In the disclosed apparatus, continuous ribbon of plastic material is received by a first conveyor which conveys this ribbon to a cutter. The cutter includes two continuously revolving rollers, each roller being equipped with a knife which is positioned in transverse relationship with respect to the longitudinal axis of the ribbon. The two knives are substantially 180° out of phase with respect to each other with the result that while one knife is engaging the ribbon for producing either a partial or a complete cut in the ribbon, the other knife is one half of a revolution away from the point of working engagement between the two rollers (the two rollers actually never touch each other) which also means that the second knife is 180° away from the first knife. When the second knife comes into the cutting position, it also produces a partial transverse cut in the ribbon. Accordingly, while the first partial cut, produced by the first knife, extends from the upper surface of the ribbon through the greater portion, or thickness, of the ribbon in the downward direction, the second partial cut extends in the opposite direction, from the lower surface of the ribbon. The cutter, thus, is so arranged that it makes a pre-determined number of upper and lower partial cuts in the ribbon, which enables one to stack up this ribbon on the pallets, the partial cuts acting as hinges enabling one to stack the slabs of rubber in a zigzag, or wigwag, manner, the partial cuts acting as pliable and readily bendable connecting lengths, or hinges, between the adjacent slabs.

After a pre-determined number of partial cuts is produced the upper roller, and its knife, are lowered that amount which is required to produce a complete cut in the ribbon. This complete cut separates one stack of slabs from the succeeding stack of slabs.

The invention also disclosed automatically operated conveyors which speed up and slow down at an appropriate moment for separating one stack from the other, for taking away the loaded pallet and replacing it with an empty pallet, and also a stacker per se which arranges the slabs of rubber that are being stacked up on the pallets so that they form a vertical column of slabs, with one slab being directly superimposed on top of the other with the respective edges of all slabs lying in four mutually perpendicular vertical planes so as to form a substantially vertical column.

It is therefore an object of this invention to provide a continuous stacking system which converts a continuous ribbon of pliable material into discreet stacks of interconnected slabs deposited on individual pallets.

It is an additional object of this invention to provide an electronic control system for automatically operating the stacking system of the above type.

It is also an object of this invention to provide a cutter for the automatic stacking system which is capable of producing a plurality of upper and lower intermeshed partial transverse cuts in the ribbon and a complete transverse cut in the ribbon, this latter cut acting as a means of separating one stack of slabs from the succeeding stack of slabs.

It is still another object of this invention to provide an automatic stacker which is capable of arranging the slabs in the form of a vertical column of slabs, properly aligned with respect to each other, so that each succeeding slab is properly superimposed over its preceding slab.

Yet another object of this invention is to provide that type of cutter and stacker in which the slabs originally are deposited in a slightly displaced manner with respect to each other, the stacker having means for then arranging the slabs so that they produce a single vertical column.

The novel features which are believed to be characteristic of this invention, both as to its organization and method of operation, together with further objects and advantages thereof, will be better understood from the following description given in connection with the accompanying drawings.

Referring to the drawings:
FIGURES 1 and 1A are side views of the continuous stacking system including conveyors, the cutter and the stacker.

FIGURES 2, 3, and 4 are explanatory figures illustrating the ribbon in its various stages of processing.

FIGURE 5 is a plan view of the stacker.

FIGURE 6 is a side view of the stacker and the conveyor used for shifting the positions of the pallets.

FIGURE 7 is a perspective view of the pallet.

FIGURES 8 through 13 are explanatory figures illustrating the side view of the stacker and of the stacked portion of the ribbon during succeeding stages of operation of the stacker.

FIGURES 14a–14e illustrate the side views of the cutter roller in their various positions.

FIGURES 15 through 17 illustrate the side views of the cutter rollers in the partial cutting positions and complete cutting position, respectively.

FIGURE 18 illustrates a side view of a ribbon with partial cuts of different depths in the ribbon.

FIGURE 19 is a side view of the cutter.

FIGURE 20 is a front view of the cutter.

FIGURE 21 is a plan view of the cutter.

FIGURE 22 is a sectional view of a roller and a side view of the knife mounted in the roller and means for adjusting the position of the knife within the roller.

FIGURE 23 is a side view 23—23, shown in FIGURE 20, of the cutter and of the driving means used in the cutter and two conveyors.

FIGURE 24 is a front view 24—24, shown in FIGURE 23, of gears connecting the cuter rollers with the conveyors.

FIGURE 29 is a side view of an upper roller and a partial view of the levers and hydraulic cylinder used for raising and lowering the upper roller.

FIGURE 30 is a transverse sectional view of the frame, the upper roller and a side view of an axle used for supporting the upper roller.

FIGURES 33 and 34 are the transverse and longitudinal sections, 33—33 and 34—34, shown in FIGURE 21, respectively, of the conveyor illustrated in FIGURE 21.

FIGURE 39 is a side view of the entire continuous stacking system.

FIGURE 40 is a schematic diagram of the stacking system.

Figure 25:
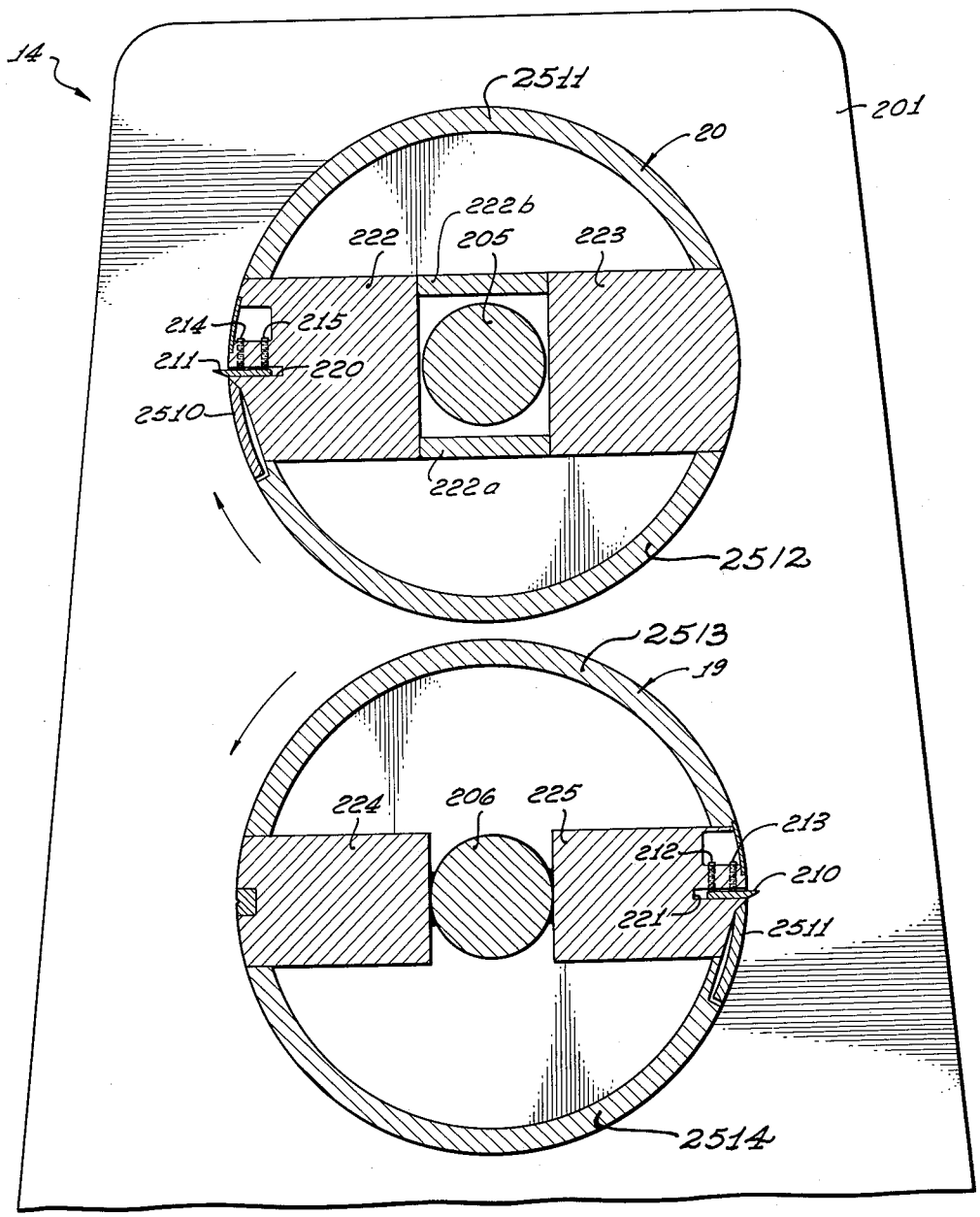
FIGURE 25 is a sectional vertical view of the two rollers taken along line 25—25 illustrated in FIGURE 20.

Referring to FIGURES 1, 1A and 39, the automatic stacking system includes conveyors 10, 11, 12 and 13, a cutter 14, a stacker 15 and a control system illustrated in FIGURE 40 which operates all of the conveyors, the cutter and the stacker in such a manner as to receive a continuous ribbon 16, produce a pre-determined number of alternating partial upper and lower cuts 250, 251 and 252, FIGURE 2, in ribbon 16, thereafter produce a single complete transverse cut 257, FIGURE 2 across the ribbon, thus cutting one piece of ribbon from the other, and then stack up the partially cut ribbon 301, 302, 303, 305, FIGURE 3 in a fan-like, or accordion-like, manner on a pallet 300.

The control system illustrated in FIGURE 40 operates in such a manner that pallets 300 are shifted by conveyor 13 in a manner illustrated in FIGURE 6, thus supplying an empty pallet immediately after the preceding pallet has received its complete folded piece, or length, of ribbon, such as those illustrated at 600 in FIGURE 6. As will be described more fully in connection with FIGURES 40 and 8 through 13, some parts of the control system are operated or controlled by means of photo-electric cells which are illustrated schematically in FIGURES 8 through 13.

Proceeding now with a more detailed description of FIGURES 1 and 1A, cutter 14 is mounted on a frame 17 which also supports a variable speed, direct current motor 18. Motor 18 drives a lower roller 19 of the cutter. The lower roller 19 is also used for driving the upper roller 20 and an intermediate gear 21, which in turn drives a gear 22. Gear 22 is used for driving conveyor 10. Gear 22 is also connected to a gear 23 which drives conveyor 11. The connections between the above mentioned gears and rollers is diagrammatically illustrated by dotted lines 24, 25, 26, 27 and 28, the arrows indicating the direction of the power transmission from the driving gear to the driven gear. As will be explained more in detail later, motor 18 drives cutter 14 and conveyors 10 and 11 at constant speed. It is preferable, however, to make motor 18 a variable speed direct current motor so that its speed can be adjusted to that speed which is desired with various compositions and thicknesses of ribbon 16. Conveyors 12 and 11 are supported by means of frame members 29, 30, 31, and 32. As will be explained more in detail later, motor 33 runs at constant speed as long as cutter 14 makes only partial cuts of the type, illustrated at 250, 251 and 252 in FIGURE 2. However, when a complete cut 257 is made, then motor 33 is made to speed up for a fixed period of time for establishing a wide gap between the two ends 258 and 259 of ribbon 16. Such separation of the two ends enables the stacker to complete the stacking operation of one complete stack 305, FIGURE 3 or 600, FIGURE 6, move such stack at its pallet 300 away from the stacker by means of conveyor 13 and at the same time position the next empty pallet 300 directly under the stacker for receiving the next series of slabs such as 301, 302, 303, etc. This mode of operation of the stacker and of the conveyors 12 and 13 will be described more in detail in connection with the description of FIGURES 8 through 13. Motor 33 is used for driving conveyor 12. As will be explained later, this motor is controlled by cutter 14.

Figure 35:
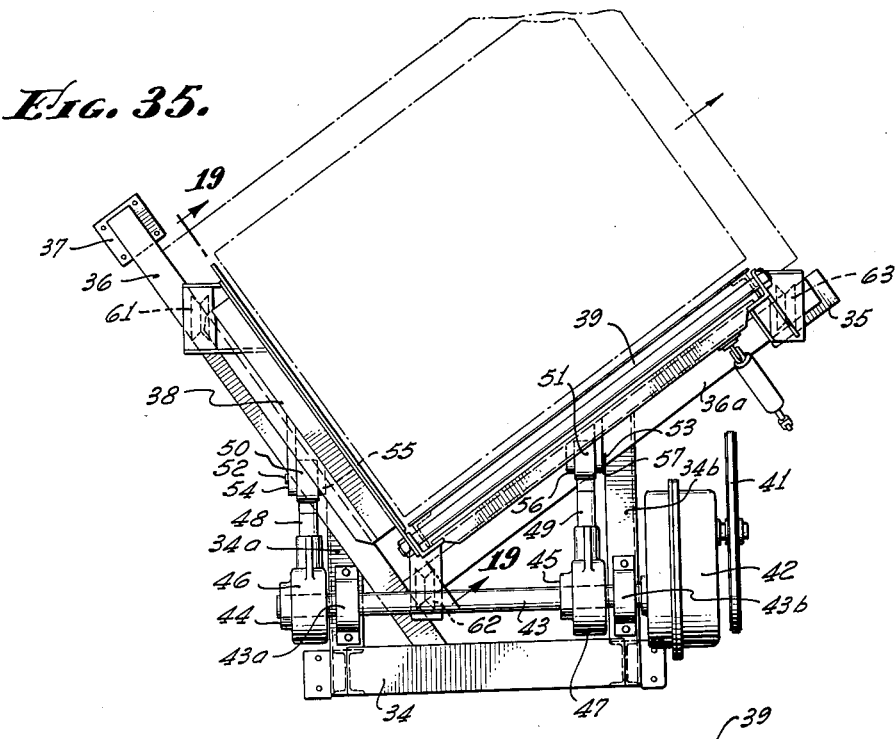
FIGURE 35 is a plan view of the stacker.
Figure 36:
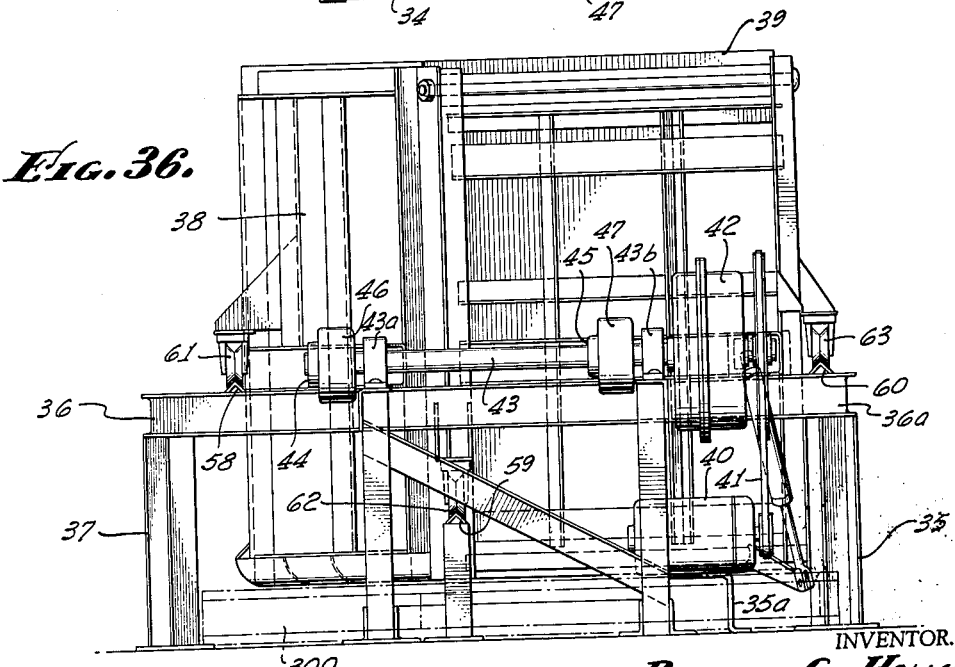
FIGURE 36 is an elevational view of the stacker.

Proceeding now with the description of stacker 15, FIGURES 1A, 35 and 36, it is mounted on a floor base 34 and it also includes a plurality of stationary frame members, such as members 34, 34a, 34b, 35, 36, 36a and 37, and two oscillating wall members 38 and 39 which are mounted at right angles with respect to each other. These oscillating wall members are mounted on three rollers 61, 62 and 63 which are best seen in FIGURES 1A, 35, 36 and 38. Walls 38 and 39 are oscillated back and forth through a fixed amplitude by a motor 40 which is mounted on the frame member 35a of the stacker and is connected, through a V-shaped drive belt 41 to a reduction gear box 42 which in turn is connected to a shaft 43. Shaft 43 is rotatively mounted in hubs 43a and 43b which are fixedly supported by the frame members 34, 34a and 34b. Shaft 43 includes two cams 44 and 45 which are connected to the cam followers 46 and 47. The cam followers are in turn connected to the cam connecting rods 48 and 49 which are best seen in FIGURE 35. The connecting rod 48 is connected to the oscillating wall member 38, while the connecting rod 49 is connected to the oscillating wall member 39 by means of hubs 50 and 51, pins 52 and 53, and the wall extensions, or brackets, 54, 55, 56 and 57. The wall members 38 and 39 are mounted on the inverted V-shaped, or crown shaped, rails 58, 59 and 60, and V-shaped wheels 61, 62 and 63 which ride back and forth on the rails when the rods 48 and 49 oscillate the entire assembly back and forth through a fixed amplitude determined by the eccentricity of the cams 44 and 45. The operation of the stacker will be described more in detail later in connection with the description of FIGURES 8 through 13. Suffice it to say at this time that the oscillating side walls 38 and 39, which are also illustrated in FIGURE 5, are used for producing a vertical stack from interconnected slabs 500, 501 and 502, etc., which are cut in such a manner as to make the successive slabs lean toward the oscillating walls 38 and 39 in the manner illustrated in FIGURE 5. The oscillating walls 38 and 39, due to their oscillating motion, then strike the adjacent two sides 510 and 511 of the slabs and in this manner successively shift the position of the respective slabs so that they become directly superimposed upon each other in the manner indicated at 600 in FIGURE 6 and at 305 in FIGURE 3 with the result that the resulting stack of slabs has four vertical side walls lying in four vertical mutually perpendicular transverse planes. The above described action and oscillation of the walls 38 and 39 and the effect upon the successively deposited slabs 301, 302, 303, 304, etc., is also illustrated in FIGURE 3. Examination of this figures indicates that the upper slabs such as slabs 303 and 304 are originally deposited close to wall 38 and, because of the oscillating action of wall 38, the slabs are later on shifted to the vertical planes 305 and 306 so as to make the successive slabs be in direct superimposition in relation to each other.

Referring now to FIGURE 2, it illustrates the ribbon 16 having a plurality of alternating partial upper and lower cuts 250, 251, 252, etc. The uncut portions 254, 255, 256, etc. of the ribbon act as flexible "hinges" or fold-forming portions of the ribbon, for folding of the partially cut ribbon in a fan-like, or accordion-like, or zigzag, manner as illustrated in FIGURE 3, which also illustrates the partial cuts at 306 and 307. As mentioned previously, the automatic stacker is arranged so that a selectable number of successive partial cuts is produced on ribbon 16, whereup the cutter produces a complete cut illustrated at 257 in FIGURE 2. The complete cut therefore separates the ribbon into two pieces and determines the length, or the height of the individual stack, such as stacks 600 in FIGURE 6. It also, therefore, determines the number of individual slabs 301 through 304 contained in each stack. As will be described more in detail later, the number of the partial cuts in a stack 600 is determined by a counter 1910, FIGURES 19, 20 and 39, which is actuated by a rotatable arm 2791 attached to the upper roller 20. After the desired number of revolutions of roller 20, counter 1910 closes an electric switch 3900, FIGURE 39. Switch 3900, upon being closed opens a solenoid valve 3901 and valve 3901 then admits compressed air to a cylinder 210 which lowers the upper roller 20 just enough so as to make the complete cut 257.

Proceeding now with a more detailed description of the transverse partial cuts 250, 251 and 252, and their relationship with respect to the longitudinal axis of ribbon 16, it has been previously mentioned that it is necessary to produce a natural inclination of the slabs toward the oscillating walls 38 and 39, such inclination being illustrated in FIGURE 5 by means of slabs 500 through 504. Examination of FIGURE 5 reveals that slab 500 is the first slab deposited on pallet 514, slab 501 is the second slab, slab 502 is the third slab, slab 503 is the fourth, and slab 504 is the fifth slab. All of the succeeding slabs, following the first slab, are displaced with respect to the preceding slab by a pre-determined fixed displacement which is determined by angles α and angles 505 and 506 which, in one specific example, are equal to 0° 16′. However, it is not sufficient only to shift the angle of the partial cut in the manner illustrated in FIGURES 5 and 4 in order to achieve the above successive displacement of the slabs with respect to each other. It is also necessary to alternate the lengths of the successive slabs, which are illustrated by the lengths "X" and (X−1⁄16″) in FIGURES 4 and 5. "X" may be any suitable length, and once this length has been selected, the length of the succeeding slab is made slightly shorter than the length of the preceding slab. In the specific example illustrated in FIGURE 4, the length of the succeeding slab is made equal to X−1⁄16 of an inch and it is this difference in the length of the succeeding slabs that produces the displacement of the succeeding slabs with respect to each other so that the succeeding slabs approach wall 39 in the manner illustrated in FIGURE 5 while the angle of the cut of the type illustrated in FIGURES 4 and 5 produces the successive travel of the successive slabs with respect to the side wall 38, the latter travel being also illustrated in FIGURE 5.

Proceeding now with the description of the cutter, which is capable of making the type of cuts illustrated in FIGURES 4 and 5, the various views of the cutter are illustrated in FIGURES 19 through 32. The cutter includes the upper roller 20, the lower roller 19, the side wall frame members 201 and 202, spur gears 203 and 204, a normally stationary axis 205 and a rotatable shaft 206, a reduction gear box 207, a pulley 208, V belts 209, frame members 17, 17A and 17B, a knife 210 mounted on the lower roller 19, a knife 211 mounted on the upper roller, (see FIGURES 25 and 26) and set screws 212 through 219 (see FIGURES 25 and 22) for holding knives 211 and 210 in fixed position in slots 220 and 221 of the respective rollers 20 and 19. The rollers 19 and 20 are provided with cross members 222 through 225 which are used for mounting roller 20 on the normally stationary axle 205 and roller 19 on the rotatable shaft 206. Shaft 206 is permanently connected to roller 19 in the manner indicated in FIGURE 25 and, therefore, roller 19 and shaft 206 rotate together in two bearings provided for this purpose in the frame members 201 and 202. Accordingly, the position of the horizontal axis of rotation of roller 19 remains fixed in its position with respect to the frame members 201 and 202, while roller 20 can be lowered and raised with respect to roller 19, as will be described more in detail below. Both rollers are fixedly connected to their respective gear wheels 204 and 203 and, therefore, the gears and their respective rollers are rotated together by motor 18 through the V belt drive 209, pulley 208, reduction gear box 207, and shaft 206.

It has been already mentioned above that the upper roller 20 can be either lowered or raised with respect to the lower roller 19. Such raising and lowering of roller 20 is necessary for two reasons: first roller 20 and its knife 211 must be lowered in order to make the complete cut in the manner illustrated in FIGURE 17, and, second, it is desirable to make the depths 1500, and 1600 of the partial cuts adjustable, as illustrated in FIGURE 18. In FIGURE 18, the two dotted lines 1800 and 1801 illustrate how the two series of the upper and lower cuts can be made progressively shallower, the upper cut 1803 being the deepest cut, and the upper cut 1804 being the shallowest, with the remaining cuts being progressively shallower from left to right, as viewed in FIGURE 18.

Figure 31:
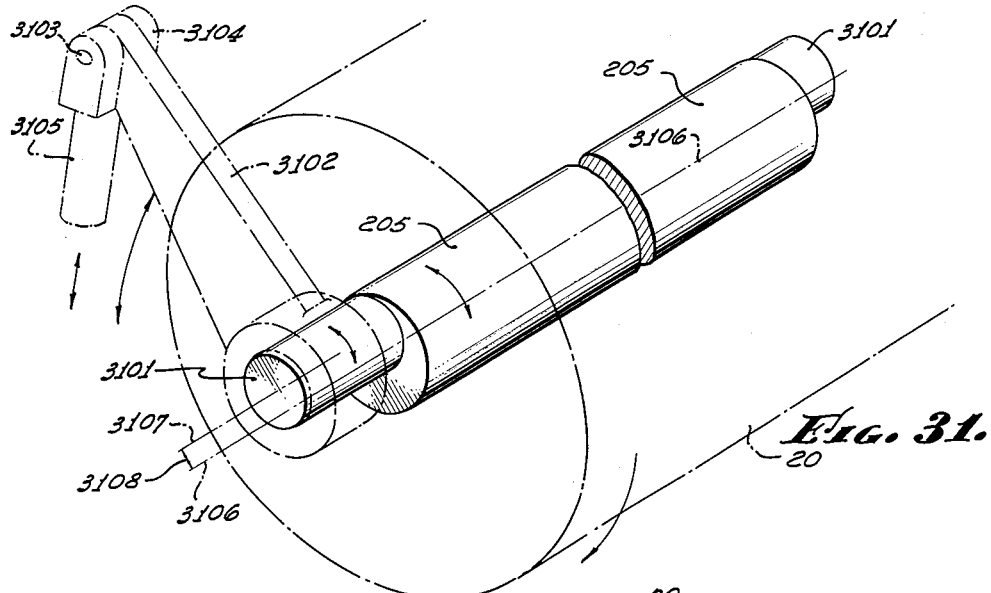
FIGURE 31 is a perspective view of the upper roller, the roller axle and cams and lever arms used in conjunction with the upper roller.

In order to adjust the depths 1500 and 1600 of the partial upper and lower cuts illustrated in FIGURES 15 and 16 and in order to enable one to make a complete cut 1700 illustrated in FIGURE 17, it becomes necessary to mount the upper roller 20 on the cylindrical axle 205 FIGURE 31 whose longitudinal axis 3106 is displaced with respect to the axis 3107 of the roller cam 3101 by a distance 3108. Roller cam 3101 constitutes an integral part of the axle-roller cam combination. Roller 20 is rotatively mounted on its axle 205 and as long as axle 205 remains in a fixed angular position or, stated differently, as long as axle 3100 remains stationary, the rotational axis of roller 20 remains in a fixed position with respect to the frame members 201 and 202 of the cutter. The cam member 3101 is rotatively mounted in the side-wall members 202 and 201 of the frame of the cutter.

The cam member is fixedly connected to a cam arm 3102. The cam arm, in turn, is connected, by means of a pin 3103 and a fork member 3104, to a piston rod 3105 which is connected to a cylinder 210, which is rotatively mounted on the side wall member 202 of the frame by means of a forked member 211, a pin 212, and a boss 213, the latter being fixedly attached to the side wall 202. The cylinder member 210 is connected by means of flexible ducts 214 through 217 to a source of fluid under pressure which is used for actuating the piston at the time it is necessary to produce a complete cut 1700 in ribbon 1701 as illustrated in FIGURE 17. This is accomplished by admitting fluid under pressure to the lower part of cylinder 210 and connecting the upper part of cylinder 210 to a fluid sump under atmospheric pressure, which enables the piston mounted in the cylinder 210 to travel in the upward direction as viewed in FIGURES 20 and 31 and 32. This upward travel of the piston is transmitted through the piston rod 3105 to the cam arm 3102 with the result that the roller cam 3101 is rotated in a clock-wise direction as viewed in FIGURES 31 and 32. Such clockwise rotation of cam 3101 produces the identical rotation of the roller axle 3100. Since the longitudinal axis 3106 is displaced from the longitudinal axis 3107 of cam 3101 in the manner illustrated in FIGURE 31, it follows that axis 3106 is rotated in a clock-wise direction around axis 3107. From the geometry and the relative positioning of the two axes 3107 and 3106, it follows that such clock-wise rotation of axis 3106 around axis 3107 lowers axis 3106 as it travels in a clock-wise direction from its upper position in a vertical plane passing through axis 3107 to its extreme lower position in the same vertical plane. Stated simply, axis 3106 is rotated in a clock-wise direction around stationary axis 3107, the radius of rotation being radius 3108. Examination of FIGURES 15, 16 and 17 indicates that only a minor lowering of the upper roller 20 is necessary in order to change the partial cut 1500 FIGURE 15 to the complete cut 1700, the actual distance of the downward travel of roller 20 corresponding to a distance 1501 in FIGURE 15. Such lowering of the upper roller 20 takes place only once for each complete stack 600 of the ribbon, all the remaining cuts of such stack being the previously mentioned alternating partial upper and lower cuts. The counting of the partial cuts is performed by counter 1910, FIGURES 19 and 20 which will be described more in detail later.

Figure 32:
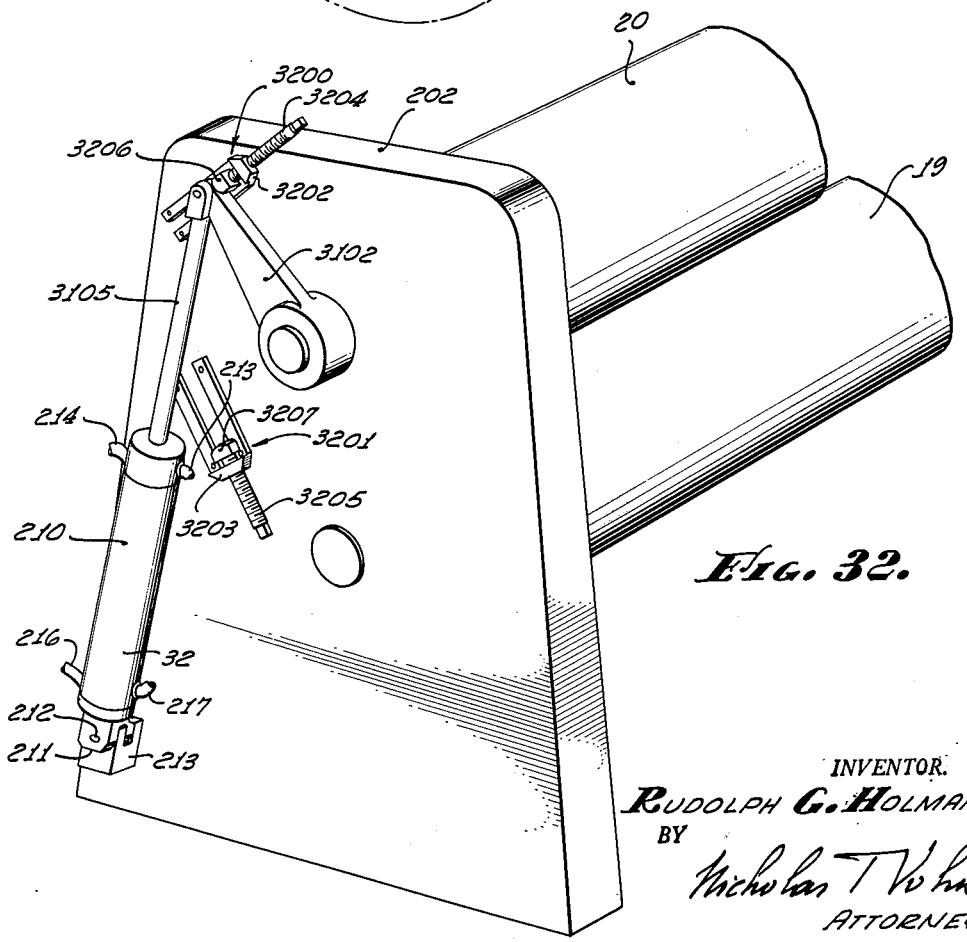
FIGURE 32 is a side perspective view of the frame, the two rollers, the hydraulic cylinder and stops used for lowering and raising the upper roller.

Referring now to FIGURE 32, it illustrates two adjustable stops 3200 and 3201 which are mounted on the side wall 202 of the cutter. Each stop has its respective threaded head 3202 and 3203, adjustable threaded rods 3204 and 3205 and bumpers 3206 and 3207 which determine the degree of the upward and downward travel cam arm 3102. Stop 3200 is used for adjusting the degree of the downward travel of axis 3106, roller axle 205 and of roller 20. Therefore, this adjustment is used for obtaining a complete cut of the type illustrated in FIGURE 17. Stop 3201, on the other hand, is used for determining the degree of the upper travel of axis 3106 and, therefore, it determines the depths of the partial cuts, or the depths 1500 and 1600 illustrated in FIGURES 15 and 16. As illustrated in FIGURE 18, the depths of these two cuts may be adjusted to any desired extent by raising or lowering bumper 3207. Raising of bumper 3207 makes the partial cut shallower and lowering of the same bumper makes this partial cut deeper, as illustrated in FIGURE 18. As also illustrated in FIGURE 18, only one adjustment and that is the setting of bumper 3207 is necessary in order to adjust the depth of the upper as well as the depth of the lower partial cuts, the two partial depths being always equal to each other as illustrated in FIGURE 18 as well as FIGURES 15 and 16. Accordingly, the depth 1500 in FIGURE 15 is equal to the depth 1600 in FIGURE 16. This is so because of the inherent geometry of the cutter and also because of the fact that the partial depths of the cuts, whether it is the upper cut 1500 or the lower cut 1600, are always determined by the vertical position of the upper roller 20 at the time the two cuts are being made by the knives 210 and 211. One can also perceive the correctness of the above description by examing the relative positions of the rollers, the knives and the ribbon in FIGURES 14a through 14e and FIGURES 15 and 16. The above results are also accomplished by adjusting the positions of the two knives 210 and 211 by means of the setscrews 215—219 and wedges 2200, 2201, FIGURE 21, as will be described below.

Referring now to FIGURE 21, which is a plan view of the cutter 14 and of the conveyors 10 and 11, it illustrates that the axis of the upper knife 211 is positioned at an angle α with respect to the upper roller axis 3107. This angle is designated as angle α in FIGURE 21 and in the specific example illustrated in this case it is equal to 2°41′. This angle of 2°41′ is the angle by which the longitudinal axis of knife 211 is displaced with respect to the roller axis 3107. The dotted line 2100, designating this knife axis, indicates that position of the knife when it is in its extreme lower position, or the position also indicated in FIGURE 15. This position corresponds to that at which knife 211 makes either a partial upper cut 1500 or a complete cut 1700. The direction of the travel of the conveyor belts 10 and 11 is indicated by arrows 2101 and 2102 in FIGURE 21. The above means that the right portion 2122 of knife 211 makes contact with the ribbon 16 first and it is then followed progressively in a transverse direction from the right edge 2110 to the left edge 2112 of ribbon 16. The actual cutting, therefore, is accomplished in a progressive, scissor-like manner which is superior to the instantaneous, guillotine-like cutting.

The longitudinal axis 2105 of the conveyors 10, 11 and 12 is displaced with respect to the axis 2122 of the knife by an angle of 90°8′ and it is this displacement of the knife with respect to the longitudinal axis 2105 that produces cuts 400 through 405 in FIGURE 4 which are 89°52′ with respect to the side 407 of ribbon 408 and at 90°8′ with respect to the opposite side 409 of the same ribbon. Such slanted position of the cuts produces the slating of the rubber slabs 500 through 504 in the direction of the side wall 38, angles 505, 506, 507 and 508 being also equal to 8′×2=16′. These angles are exaggerated in all the figures since it is obvious that an angle of 8′ is hardly perceptible on the scale used in all the figures.

It has been already stated previously that the length of the slabs are slightly different, one slab having the length "X," and the next X−a, where a is equal to $\frac{1}{16}$ of an inch in one example. This is accomplished by either advancing or receding the position of one knife so that the two knives are not exactly 180° out of phase, as mentioned previously, but are either more or less than 180° to the extent desired for achieving the staggered displacements indicated by the lines 510 and 512 in FIGURE 5.

Referring now to FIGURE 22, it illustrates the type of mounting of the knives 211 and 210 in their respective rollers 20 and 19 for producing the cuts discussed above. As mentioned previously, these knives remain in a fixed position once they are mounted in their rollers, the fixed position in their rollers being obtained by tightening of the studs 212 through 219 (see FIGURES 25 and 22). However, it is desirable to have some means for adjusting the position of the knives in their respective slots 220 and 221, FIGURE 25, and in order to accomplish this, the slots also incorporate two sliding and adjustable wedges 2200 and 2201, the positions of which are adjusted by means of micrometer screws 2202 and 2203, which are rotatively mounted in hubs 2206 and 2207. These hubs are attached to the roller by means of studs 2204 and 2205. Thus micrometer screw adjustment enables one to adjust, with the desired degree of precision, the position of the knife edge 2210 by sliding in or out the wedge members 2200 and 2201. This adjustment is being made, of course, prior to the tightening of the studs 212 through 219. Once the desired position of the knife 2210 has been obtained, studs 212 through 219 are tightened and thereafter the knife remains in a fixed position in its roller throughout the operating cycle of the machine. Accordingly, the knives can be taken out of the machine, sharpened, or replaced in the manner described above.

Referring now to FIGURES 23 and 24, these figures illustrate the fact that roller 19 drives roller 20 through gear wheels 203 and 204, gear 204 being connected to the variable speed motor 18 in the manner illustrated in FIGURES 1 and 20. Gear 204 also drives the intermediate gear 21, which drives gear 22 of conveyor 10, and gear 22 of conveyor 10 drives gear 23 of conveyor 11 through an endless chain 2300. Since the plane of the gears 203 and 204 does not coincide with the plane of the conveyor gears 22 and 23, it becomes necessary to drive the conveyor gears 22 and 23 through two intermediate gears 21 and 2400, gear 2400 being a helical gear. The side view of these gears with respect to each other is illustrated in FIGURE 24, this view being taken along line 24—24 illustrated in FIGURE 23. As stated previously, the rollers 19 and 20 and the conveyors 10 and 11 operate at constant speed.

Figure 26:
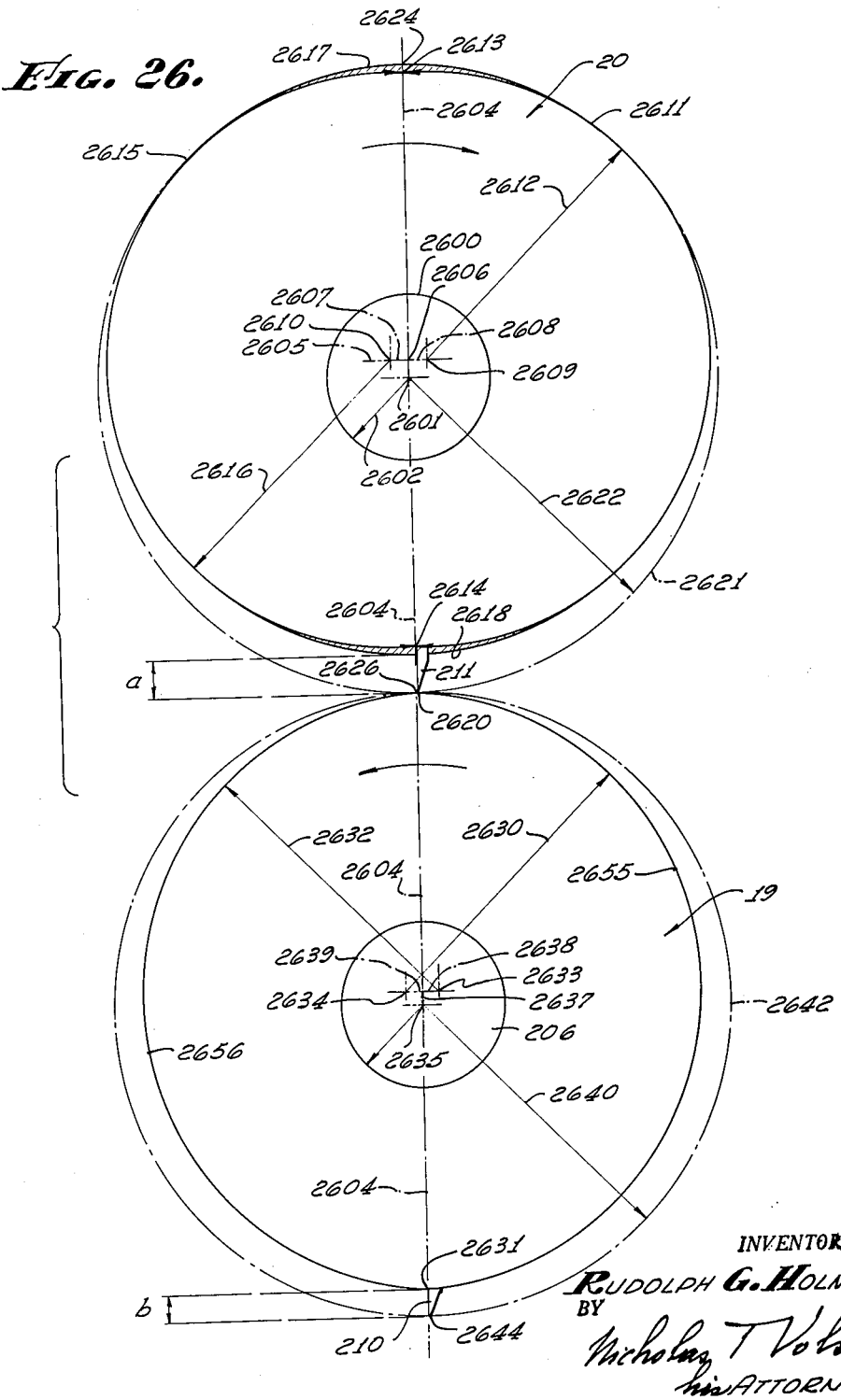
FIGURE 26 is the same view of the rollers illustrating the geometry of the two rollers.

Referring now to FIGURE 26, it illustrates the vertical transverse sectional view through the upper and lower rollers 20 and 19, identical to the section 25—25 shown in FIGURES 20 and 25. This figure illustrates the geometry of the rollers 19 and 20. Examination of the upper roller reveals the fact that its geometry is obtained in the following manner: The roller is provided with a circular opening 2600 whose center is indicated at 2601 and whose radius is indicated at 2602. This is the central opening which is used for mounting the upper roller 20 on its axle 3100 FIGURE 31, axle 205, as mentioned previously, being stationary and roller 20 revolving around this cylindrical axis. As indicated in FIGURES 26 and 30, roller 20 is provided with ball bearings 3000, 3001, 3002 and 3003 and in this manner roller 20 revolves around axle 205. Roller 20 is rotated around this axle by means of gear 203 as illustrated in FIGURES 19, 20, 21, 23, 24, and 30.

The outer surface of roller 20 is obtained as follows: A line 2604 is drawn which passes through the centers 2601 and 2635. In this case it is a vertical line. Then a horizontal line 2605 is drawn through point 2606 lying on line 2604 and two equidistant portions 2607 and 2608 are measured on line 2605 to the left and to the right of point 2606. Accordingly, two points 2609 and 2610 are obtained, which lie on line 2605, equal distances apart from points 2606 and 2601. Point 2609 is then used for ascribing an arc 2611 with a radius 2612, this arc ending at points 2613 and 2614, which lie on the vertical line 2604. An identical arc 2615 is ascribed by means of a radius 2616 whose length is equal to radius 2612 but whose center is located at point 2610. This arc also ends at line 2604, the two arcs 2611 and 2615 meeting each other at points 2613 and 2614. The resulting depression in the vicinity of the points 2613 and 2614 is then filled by means of arcs or curves 2617 and 2618 so as to produce a continuous smooth surface on the roller 20. The filling at 2617 and 2618 is not essential and may be omitted altogether. Knife 211, and especially its sharp edge 2620, lie in the vertical plane passing through the vertical line 2604. It is assumed here that the plane of the transverse section appearing in FIGURE 26 bisects the rollers 20 and 19 and also bisects knife 211. This is necessary in order for the point of the edge 2620 to coincide with the straight line 2650 joining points 2601 and 2635. It should be remembered that knife 211 is placed at the small angle α with respect to the axis 3107 of roller 20, this angle α being illustrated more clearly in FIGURE 21. Accordingly, point 2620 in FIGURE 26 corresponds to the similarly numbered point 2620 in FIGURE 21. Examination of FIGURE 21 also reveals the fact that if one were to recede somewhat either to the left or to the right of point 2620, or the mid portion of the knife edge, then point 2620 will no longer coincide with line 2604.

As also mentioned previously, the knives 211 and 210 are both mounted at an angle with respect to the longitudinal axis of their respective rollers so as to produce a scissor-like operation of the knives, with the knives cutting the ribbon gradually in the transverse direction as differentiated from an instantaneous transverse uniform cut clear across the ribbon, which would be produced by a knife whose edge lies in the same plane with the rotational axis of the rollers.

Examination of FIGURE 26, and more particularly examination of the rollers circumference, reveals the fact that it is possible to draw a circle 2621 with a radius 2622 whose center is placed at point 2601, the length of this radius being equal to the distance from center 2601 to a point 2624 lying on the surface of roller 20 and also on line 2604. The circle then also passes through the knife edge 2620 and the position of the knife edge normally should be adjusted so as to satisfy this geometry. When this is the case, then the peripheral velocity of edge 2620 of knife 211 is equal to the peripheral velocity of point 2626 on the surface of roller 19, this point 2626, in its geometry, corresponding to point 2624 on the roller 20. The two peripheral velocities must be equal in order to produce a clean cut in ribbon 16. If the two velocities were not equal, then the cut would not be clean because it would produce also a tearing, or shearing, or at least a distortion in ribbon 16.

The geometry of the lower roller 19 is similar to the geometry of the upper roller 20. A radius 2630 is used for ascribing an arc 2655 from point 2626 to a point 2631, and a radius 2632 is used for ascribing an arc 2656 from point 2626 to point 2631. The centers 2633 and 2634 are displaced from the center 2635 of shaft 206 by distances 2637, 2638, and 2639. A radius 2640, whose length is equal to the distance from the center 2635 to point 2626, may then be used to ascribe circle 2642 which passes through the tip, or the edge, 2644 of knife 210. Examination of the shape of the rollers 19 and 20 reveals the fact that roller 19 departs from a circle by a greater margin than roller 20. The lengths of the two radii 2640 and 2622 are equal and, therefore, the diameters of the two circles 2621 and 2642 are also equal. These two circles are the two pitch circles of the gears 203 and 204. In general, the geometry of the two rollers should be such that the length of the radius 2622 should be equal to the radius 2640 for obtaining equal angular and peripheral velocities between the two rollers at the time of actual cutting, or more correctly, equal peripheral velocities between points 2624, 2626, 2620 and 2644. The circles 2621 and 2642 then also represent the pitch circles of the roller gears 203 and 204, and therefore, the peripheral velocities of the circles 2621, as the two rollers rotate, are equal. The edge 2620 of the upper knife 211 then is placed on the pitch circles 2621 and 2642 at the point where the two pitch circles are tangent to each other, and the surface 2618 of roller 20 is then recessed away from the edge 2620 of knife 211 by a distance "a" which should be slightly larger than the maximum thickness of ribbon 16 that is contemplated in connection with the use of the automatic stacking system. For example, in one specific example the maximum contemplated thickness of ribbon 16 is one-half of an inch. Distance "a" then is made equal to ⅝". The diametrically opposite point 2624 on roller 19 is also placed on the pitch circle 2642 and, therefore, when the upper roller 20 revolves 180° from the position indicated in FIGURE 26, then point 2644 will occupy the position of point 2626 or 2620 on the pitch circles 2621 and 2642, the two points being one identical point since the two pitch circles 2621 and 2642 are tangent to each other at these points. When point 2624 assumes this position, then the knife edge 2644 of the roller knife 210 is also at point 2626 and, therefore, ribbon 16 would be cut through completely by knife 210 if it were not for the fact that during the rotation of the two rollers through 180°, roller 20 is lifted up by the lever arm 3102 and piston rod 3104 which is connected to the piston sliding up and down in cylinder 210. The geometry of the lower roller 19 is such that knife 210 projects above roller 19 by a distance "b" which is slightly smaller than distance "a." In the previously quoted example, where distance "a" is made equal to ⅝", distance "b" is made equal to ½". This is necessary to enable the upper knife 211 to make a complete cut in the ribbon 16 and only a partial cut by means of knife 210. Accordingly, the surface of the roller 19 at point 2631 is displaced from point 2644, which is on the pitch circle 2642, by a distance of ½" and this distance then determines the degree of eccentricity imparted to the lower roller. The two rollers are illustrated in FIGURE 26 in such a position with respect to each other that knife 211 and its edge 2620 makes contact with point 2626 and therefore it will produce a complete cut in ribbon 16 since there is no gap between the edge 2620 and point 2626 lying on the surface of the lower roller 19. If the two rollers, and especially their axis of rotation 2601 and 2635, were to remain in the positions illustrated in FIGURE 26, then when the edge 2644 of knife 210 would come to its upper position, then it also would contact point 2624 lying on the surface of the upper roller 20 and it would also produce a complete cut in ribbon 16 because there would be no gap between the knife edge 2644 and the matching surface of roller 20. Since, according to the normal functioning of the entire automatic stacking system, it is unnecessary to produce a complete cut in ribbon 16 by means of knife 210 at any time, knife 210 only producing at all times a partial cut in ribbon 16, it follows that it becomes necessary to lift axis 2601 away from the knife edge 2644 by the time the latter assumes the upward position, i.e. the position at which knife edge 2644 momentarily lies on the pitch circle 2621 of the upper roller 20. Such shifting or lifting of the upper axis 2601 has been already described in connection with the description of FIGURE 31. Referring to FIGURES 1, 29, 31 and 32 once more, it may be remembered that the longitudinal axis 3106 of the roller axle 205 can be lifted or lowered by means of cam 3101, cam arm 3102, piston rod 3105, and an air cylinder 210 which is connected to a source of compressed air through flexible air hoses 214 through 217. This cylinder, the sequence of operation of which will be described later in connection with the description of FIGURE 40, lifts roller 20 to its upward position immediately after the making of the complete cut 257, FIGURE 4, and roller 20 remains in this upward position throughout that period of time when the cutter is required to make only the partial cuts. As illustrated in FIGURE 19, the cutter is provided with a counter 1910 which can be set to any desired setting so as to produce any desired number of the partial cuts. It then closes the circuit of an electrical switch 3900 which actuates a solenoid valve 3901 which admits air either to the upper or lower chamber of cylinder 210 either for lifting or lowering the upper roller 20. According to the disclosed mode of operation of the cutter, it is lowered only momentarily for making one complete cut after the cutter has made 84 partial cuts in ribbon 16. The degree of the upward and downward travel of the upper roller 20 is made adjustable by means of stops 3206 and 3207.

Figure 27:
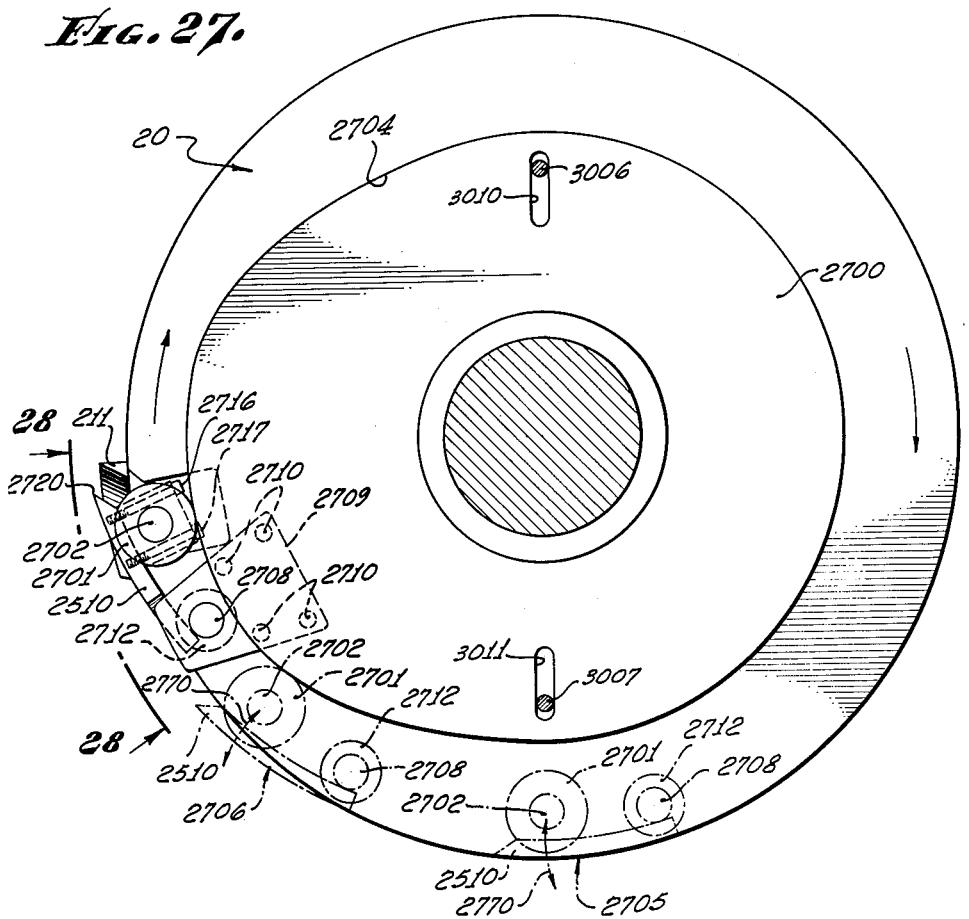
FIGURE 27 is a side view of a stationary cam, the view being taken along line 27—27 illustrated in FIGURE 30.
Figure 28:
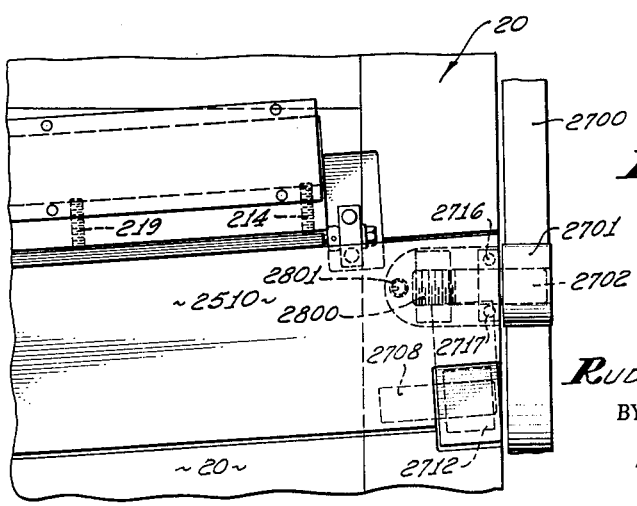
FIGURE 28 is a plan view of a portion of a slab release member and of a cam and cam follower operating the slab release, the view being taken along line 28—28 shown in FIGURE 27.

The only remaining feature of the cutter that needs description is the strippers including plates 2510 and 2511, the vertical sectional view of which is illustrated in FIGURE 25. The stripper plates 2510 and 2511 are actuated by means of cams which periodically revolve these plates around their pivots in the outward direction, away from the circular surface of the two rollers, and in this manner these plates 2510 and 2511 push ribbon 16 away from the respective rollers and the knives 210 and 211. In this manner, the stripper plates 2510 and 2511 strip ribbon 16 off the knives 211 and 210 respectively, thus insuring the fact that ribbon 16 will not adhere to the surface of the knives. Examination of FIGURES 15, 16 and 17 reveals the fact that ribbon 16 does not touch the surface of that roller which includes the cutting knife. Therefore it is necessary to strip the ribbon from the respective knives only. The cam for operating the stripper plates, either 2510 or 2511, is illustrated in FIGURES 27 and 30. It is a stationary cam 2700 which is permanently attached to the frame member 202 by means of studs 3006 and 3007 which is best illustrated in FIGURE 30. As also illustrated in FIGURE 30, cam 2700 is provided with sufficiently large slots 3010 and 3011 to permit free up and down movement of cam 2700 with roller 20. This up and down movement of cam 2700 takes place when axle 205 is rotated by arm 3102 and a bushing 3009, mounted on recessed portion 3008 then either raises or lowers cam 2700. Axle 205 is mounted in bearings 3004 and 3005 which are mounted in the side wall members 201 and 202. The stripper plate 2510 is pivoted, or hinged, around two fixed pivots, one of which, pivot 2703 being visible in FIGURES 27 and 28. These pivots are fixedly attached to the stripper plate 2510 and rotate in hubs, such as 2712, the hubs being fixedly attached to roller 20. Therefore, stripper plate 2510 can travel, or swing, outwardly and inwardly, as illustrated by an arrow 2770. Normally, stripper plate 2510, through the greater portion of its revolution together with roller 20, is in the inward position illustrated at 2705. In order to hold plate 2510 in its inward position, it is provided with two springs, such as 2801, which hold it in a closed position, flush with the adjacent surface of roller 20. In order to produce the stripping action, plate 2510 is provided with a cam follower 2701 which is rotatively mounted on a pivot 2702. Pivot 2702 is connected to plate 2510 by means of a threaded end 2800 and threaded studs 2716 and 2717 in the manner indicated partially in dotted lines in FIGURES 27 and 28. Therefore, as roller 20 rotates, pin 2702 follows the rotation of the plate 2510, which rotates with roller 20 and, therefore, the cam follower 2701 also rotates with the roller. Normally, cam follower 2701 does not contact cam 2700 through the greater portion of the cam surface 2704, as illustrated at 2705 position of plate 2510. When the plate of the cam follower advances still further in the clockwise direction, then, at position 2706, cam follower 2701 begins to deflect plate 2510 outwardly and the stripper plate 2510 is pushed outwardly in the manner indicated in the drawing. When the cam follower 2701 reaches the position illustrated in solid lines in FIGURE 27, then the stripper plate 211 is pushed outwardly to the maximum extent and in this manner it strips ribbon 16 from knife 211. Cam 2700 is positioned on the frame member 202 in such a manner that the maximum deflection of the stripper plates 2510 takes place immediately after the knife cuts the ribbon so that the stripper plate prevents any possibility of the ribbon being carried in the upward direction with the knife after it has been either partially or completely cut.

Since the knives 210 and 211 are mounted at an angle with respect to the axis of rotation of the respective rollers, as illustrated in FIGURES 20 and 21 (see angle $\alpha = 2°41'$ in FIGURE 21) it becomes also necessary to mount the stripper plates in the same manner so that the stripping edge, such as edge 2720, is in direct proximity of, and is parallel to, the adjacent portion of the knife.

Referring now to FIGURES 33 and 34, FIGURE 33 illustrates the transverse section 33—33 (see FIGURE 21) of conveyor 11, and FIGURE 34 illustrates the longitudinal section 34—34, also shown in FIGURE 21. Conveyor 11, and especially its flat plates 3300 and 3301 are inclined at an angle β with respect to a horizontal line 3302, this angle may be in the order of 2°. The conveyor is also provided with an air duct 3303 corrected to a source of compressed air through a plurality of ducts 3304. Plates 3300 and 3301 are provided with a series of orifices 3305 and 3306 which introduce compressed air under ribbon 16 and thus partially at least support ribbon 16 on a film of air, like in aerostatic and aerodynamic bearings. This air bearing action and slanting of the plates by angle β, keeps ribbon 16 in constant engagement with an edge guide 3308 which, in turn, guides ribbon 16 in proper alignment from cutter 14 to stacker 15. This air bearing arrangement is necessary in connection with the conveyors 11 and 12 since the partially cut ribbon does not have enough tensile strength to be pulled by these two conveyors without causing any deformations in ribbon 16.

Figure 37:
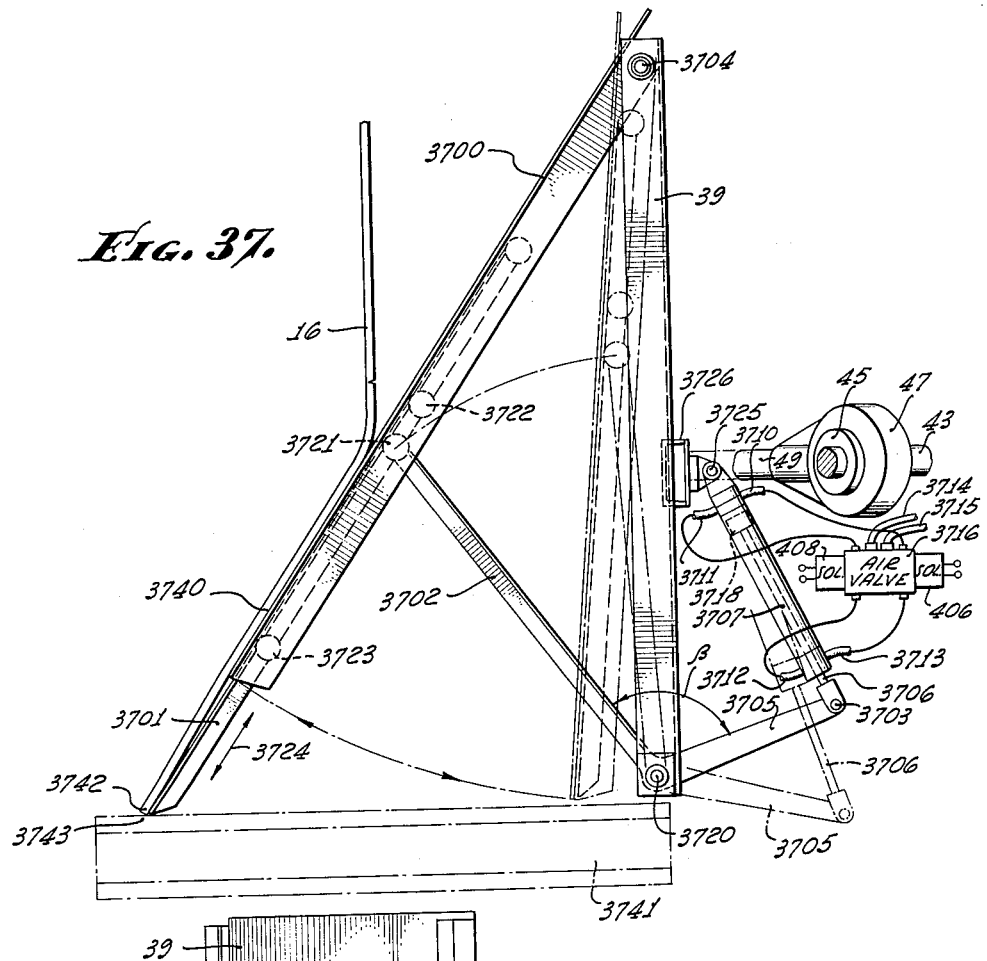
FIGURE 37 is a side view of a portion of a stacker frame.
Figure 38:
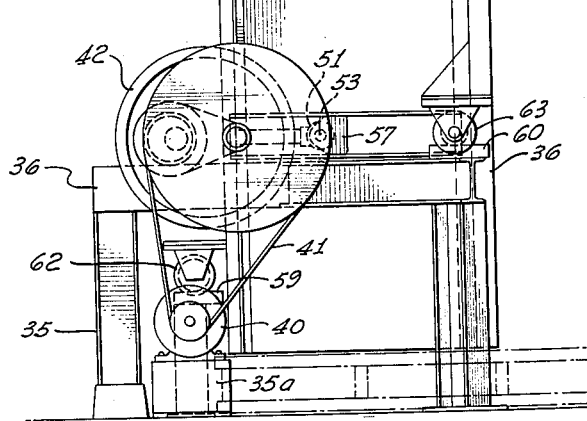
FIGURE 38 is an elevational side view of the stacker.

Referring now to FIGURE 37, it illustrates a side view of the oscillating wall 39 of the stacker which is oscillated back and forth by means of cams 45 and 47, pushrod 49 and motor 40. This arrangement has been described already in the early part of the specification and need not be repeated here. It is necessary to place the first slab 3740, illustrated in FIGURE 37, in proper manner on a pallet 3741, so that its edge 3742 is at a point 3743 of pallet 3741. In order to guide edge 3742 to point 3743, it becomes necessary to provide a slab guiding chute, composed of two metallic chute plates 3700 and 3701; these plates are in a slanted position, illustrated in solid lines in FIGURE 37, when slab 3740 is about ready to leave conveyor 12, as indicated in FIGURE 8. When slab 3740 reaches point 3743 on pallet 3741, it interrupts the light beams 800 and 803. These light beams are produced by two respective light sources 800 and 802 which have their respective light beams focused on the cathodes of the photoelectric cells 401 and 403, illustrated in FIGURES 8 through 13 and also in FIGURE 40. These photoelectric cells and the relays actuated by these photoelectric cells are used for controlling the operation of a piston 3718 positioned in a cylinder 3707. The piston is connected to a piston rod 3706. Rod 3706 is connected by means of a hinge, or pin 3703 to a lever arm 3705 which is connected to lever arm 3702. The lever arms 3705 and 3702 represent an L-shaped bell-crank revolving around an axle 3720. Axle 3720 is rigidly connected to the sidewall member 39. Angle β, between the two arms 3705 and 3702, of the bell-crank, therefore is a fixed angle and, therefore, the arms 3705 and 3702 represent a single rigid crank arm which revolves around pin, or axle, 3720 mounted in and supported by the oscillating plate 39. Crank arm 3702 is connected to plate 3701 by means of a pin 3721. The outer end of crank arm 3702 revolves around the pin, the pin being rigidly mounted in plate 3701. Plate 3701 forms a sliding engagement with plate 3700. In order to obtain such sliding engagement, plate 3701 is provided with four rollers, only two rollers 3722 and 3723 being visible in his figure, the other two rollers being in line with the visible rollers. These rollers have suitable tracks on plate 3700 permitting plate 3701 to slide up and down along plate 3700 in the manner indicated by a double arrow 3724. Such up and down sliding of plate 3701 is accomplished by admitting compressed air first to one side and then to the other side of cylinder 3707 which results in the actuation of piston 3718 and of crank arm 3705—3702 into two positions; the first position is illustrated in solid lines and the second position is illustrated in dotted lines. The dotted line position indicates that the plates 3700 and 3701 eventually swing into the vertical position and, therefore, coincide with the plane of the oscillating wall 39 of the stacker.

The operation of the chute will be given here, while a more detailed operation of the solenoids 408 and 406, which in turn control the operation of air valve 3716, will be described more in detail in connection with the description of FIGURE 40, which is the schematic diagram of the electrical relay system used for controlling the stacker and conveyor 13. The operation of the chute will be described in connection with FIGURES 37 and 8 through 13, which illustrate the various positions of the chute and its cylinder 3707 which is suspended from wall 39 by means of a pin 3725 and a bracket 3726.

Referring to FIGURES 37 and 8, when ribbon 16 is in the position illustrated in FIGURE 8, the lower end 3740 of the ribbon has already interrupted the light beam 800 and, therefore, has de-energized photoelectric cell 401. Such de-energization of photoelectric cell 401 has no immediate effect on the solenoids 406 and 408, and air valve 3716 and, therefore, piston 3718 in cylinder 3707 remains in that position which is illustrated in solid lines in FIGURE 37 and FIGURE 8. Therefore, the chute remains in a slanted position also shown in solid lines in these two figures. When edge 3742 of ribbon 16 makes a contact with plate 3741 in the manner indicated in FIGURES 37 and 9, then slab 3740 interrupts the second light beam 803, which de-energizes the second photoelectric cell 403. Such de-energization of photoelectric cell 403 produces a de-energization of one solenoid 408 and energization of the second solenoid 406 with the result that air valve 3716 supplies compressed air to the upper part of cylinder 3707 and, at the same time connects the lower part of the cylinder to atmospheric pressure. The connections between the air valve 3716 and cylinder 3707 are illustrated by means of air hoses 3710, 3711, 3712 and 3713. When compressed air becomes admitted to the upper portion of cylinder 3707, its piston 3718 slides to its extreme lower portion within cylinder 3707, and piston rod 3706 assumes the position illustrated in dotted lines. This, in turn, swings the crank arm 3705—3702 into its dotted position with the result that the lower chute plate 3701 slides into its upper position and the entire chute then assumes the vertical position illustrated in FIGURES 10, 11 and 12. When ribbon 16 and its upper slab 1200 assume the position illustrated in FIGURE 12, light beam 800 again shines on the cathode of photoelectric cell 401 with the result that solenoid 406 becomes de-energized and solenoid 408 becomes energized, thus, returning the chute plates 3700 and 3701 into their slanted position illustrated in FIGURES 13 and 37. The process of guiding the next succeeding slab 1300 into its proper position is a repetition of what has been described above. The beginning of the next cycle is illustrated in FIGURE 13, which is identical to FIGURE 8, except that it illustrates the succeeding slab 1300 in the position of the preceding slab 3740, illustrated in FIGURE 8.

Referring now to FIGURE 40, it illustrates the schematic diagram of the control system which is used for controlling the operation of the stacker, of the air valve which is used for operating the slide chute 3700—3701 of the stacker, and for operating motor 620 of conveyor 13. The entire control system is connected across two bus bars 430 and 431 which are connected to a source of alternating current 433. The following elements are connected across the bus bars 430 and 431: a bimetallic element 400 is connected across the bus bars and its contacts 420 are connected between points 434 and 435 on bus 430. Contacts 420 are closed by the bimetallic element after a predetermined time delay which takes place upon the normal closing of the main switch 440 which energizes the bus bars 430 and 431. This time delay is necessary to prevent an initial erroneous cycle of the pallet conveyor from occurring immediately upon closing of the main switch. Such erroneous cycle would take place without the presence of contacts 420 because of the lag which is present in the photo-electric cells 401 and 403 whose cathodes require a finite time for reaching the electron-emissive temperature. The control system also includes two photo-electric cells 401 and 403 which are connected in series with their respective relay windings 402 and 404. Relay 402 has only one set of contacts 409 which are normally closed contacts when winding 402 is energized. This is indicated in this diagram by a cross line 430, this being the standard symbolic indication of the normally closed contacts. Relay 404 has two sets of contacts 405 and 407. Contacts 407 are normally closed when relay 404 is energized and contacts 405 are normally open. Contacts 405 are connected in series with a solenoid 406, this solenoid being used for controlling the operation of the air valve 3716 which in turn controls the operation of cylinder-piston combination 3707—3706 used for operating the chute plates 3700—3701 of the stacker in the manner which will be described later on. The normally closed contacts 407 are connected in series with the second solenoid 408 which is also used for controlling the air valve 3716 and the piston cylinder combination 3707—3706. The normally closed contacts 409 of relay 402 are connected in series with the winding of a time delay relay 410. This time delay relay 410 has one set of normally open contacts 412 which are connected in series with a micro-switch 413 and a relay winding 414. The micro-switch 413 is that micro-switch which is also illustrated in FIGURE 6 and which is periodically actuated by the moving dogs 610 mechanically connected to the conveyor belt 601. The conveyor belt dogs 610 are positioned on the belt 601 in such a manner that the micro-switch 413 becomes actuated every time a complete length of one pallet 300 plus a clearance between adjacent pallets has been advanced to its normal position so as to receive the pre-cut rubber ribbon 16 in the manner which has been described previously. Opening of micro-switch 413 de-energizes relay winding 414. The micro-switch 413 is a normally closed switch which becomes momentarily open when the conveyor dogs 610 make a mechanical contact with the switch-actuating trigger 416. Immediately upon such actuation and momentary opening of the switch, the conveyor motor 620 becomes de-energized. Relay 414 is provided with one set of normally open contacts 415; these contacts are connected in parallel with contacts 412 and in series with switch 413 and relay 414; contacts 415 act as relay locking locking contacts as explained below.

The operation of motor 620 is as follows: After switch 440 has been closed, the bimetallic element 400 and, after a delay, its contacts 420 energize the bus bars 430 and 431; the winding of the time delay relay 410 becomes energized. The bimetallic element 400 is timed in such a manner that it interposes sufficient delay in the circuits of the relay windings 410 and 414 so as to allow ribbon 16 to reach the stacker from cutter 14 and break the light beam 800 from the light source 801, FIGURE 8, which normally shines on the photo electric cell 401. Such breaking of the light beam by ribbon 16 de-energizes photo electric cell 401 and the winding of relay 402. De-energization of winding 402 opens contacts 409 and prevents the energization of the time delay relay winding 410 even after contacts 420 of the bimetallic element become closed. It is necessary to have such mode of operation of the control system so as to prevent an unnecessary advancement of conveyor 13 immediately upon the energization of the entire control system. Time delay must be interposed between the instant the entire system is started and is in opeartion and the time when the operation of conveyor 601 begins. Conveyor 601 should be made to operate only after an empty pallet receives a complete stack 600 of slabs of ribbon 16. Contacts 420 are positioned on bus bar 430 between points 434 and 435. Therefore, relays 410 and 414 cannot become energized until contacts 420 close. The time delay furnished by the bimetallic element 400 is equal to the time it takes for ribbon 16 to travel through the entire stacking system and then to descend from conveyor 12 to stacker 15 whereupon this ribbon interrupts the light beam 800. Assuming now that ribbon 16 has reached the above mentioned light beam and has interrupted the circuit of relay 402, de-energization of relay 402 opens contacts 409 which prevents energization of the time delay relay winding 410 even after contacts 420 become closed. Since relay 410 is not energized, contacts 412 also remain open and relay 414 cannot be energized.

After ribbon 16 descends still further and reaches pallet 300, it interrupts the second light beam 803 and photo electric cell 403 and relay 404 become de-energized. De-energization of relay 404 reverses the initial positions of contacts 405 and 407: contacts 405 become closed and contacts 407 become open with the result that solenoid 408 becomes de-energized and solenoid 406 becomes energized. Compressed air becomes admitted through air valve 3716 to cylinder 3707 and this cylinder, with the aid of its piston, piston rod 3706 and lever arm 3705 rotates plates 3700 and 3701 around hinge 3704 supported by the oscillating side-wall 39 until it assumes a vertical position shown in FIGURES 3, 37, 10, 11 and 12. Stacking of ribbon 16 continues until the pre-determined number of slabs has been stacked on pallet 300 which is determined by counter 1910 (see FIG. 39) whereupon the trailing end of ribbon 16 leaves conveyor 12 and exposes photo-electric cell 401 once more to the light beam 800, as shown in FIGURE 12. This makes photo-electric cell 401 conductive, which energizes relay 402 and relay 402 closes contacts 409. This in turn energizes the time delay relay 410 which energizes contacts 412. Since micro-switch 413 is normally closed, closing of contacts 412 energizes relay winding 414 which closes contacts 415. Contacts 415 establish a holding circuit for winding 414, and therefore relay 414 remains energized after contacts 412 open. Contacts 412 open after a pre-determined time delay even though the winding of relay 410 remains energized. Relay 410 is a time delay relay merely for the purpose of providing sufficient time delay which is required for establishing a holding circuit for winding 414 through contacts 415. Motor 620, FIG. 6, then moves the fully loaded pallet 300 away from the stacker and positions the next empty pallet into the stacker to receive the new column of slabs of ribbon 16. Motor 620 will be energized only for a limited period of time, i.e. that time which is required only for shifting the pallet from the stacker and positioning the next succeeding empty pallet into the stacker. This is accomplished by the conveyor dog 610 which opens micro-switch 413 and thus at once de-energizes motor 620. When the fully loaded pallet is moved away from its position in the stacker, the second light beam 803 will reach photo-cell 403, as shown in FIGURE 8 and will re-energize photo electric cell 403 with the result that relay 404 becomes energized. Energization of relay 404 again reverses the position of contacts 405 and 407 so that contacts 405 become open and contacts 407 become closed. This operates the air valve 469 in such a manner that the cylinder-piston combination 3707 moves the chute plates 3701 and 3700 into its slanted position, illustrated in FIGURES 1, 8 and 37. The system now is ready for the next cycle of operation, identical to the one described above.

It now remains only to summarize the description of the entire stacking system. Since the operation of its individual components has already been given above, only a brief résumé should suffice.

The conveyors 10, 11 and 12, and cutter 14, and motors 18, 33 and 40 become energized upon closing of the switches (not illustrated) connecting these motors to their respective sources of potential. Switch 440 is also closed at the time of the closing of the motor switches but such closing of switch 440 does not produce the immediate closing of the circuit of motor 620. Therefore, there is no premature actuation of conveyor 13 upon the actuation of the entire stacking system, and, therefore, pallet 301 remains stationary in its proper position in stacker 15. At the time of the actuation of the entire system, the upper roller 20 of cutter 14 is in its upper, or raised, position, which is the position that produces only partial upper and lower cuts in ribbon 16. Therefore, cutter 14 will produce partial cuts in ribbon 16 after ribbon 16 reaches the cutter, and such partial cutting will continue until counter 1910 will produce closing of switch 3900. Closing of switch 3900 actuates solenoid valve 3901. Valve 3901 then produces compressed air connections for cylinder 210 of such nature that roller 20 is momentarily lowered to the position illustrated in FIGURE 29 with the result that roller 20 and its knife 211 produce a complete cut in ribbon 16 of the type shown in FIGURES 2 and 17. Immediately upon producing such complete cut, cylinder 210 and the lever arms 3102 and 3105 connected to the piston mounted in cylinder 210, raise the upper roller 20 to its upper position so as to resume the production of the partial cuts of the type illustrated in FIGURE 2.

Closing of switch 3900 also produces energization of relay 3901 in FIGURE 39, which opens the normally closed contacts 3902 of this relay. (See motor 33 and its field circuit with contacts 3902.) Contacts 3902 are connected in parallel with a field resistance 3903. This resistance is connected in series with a field winding 3904 of the direct current variable speed motor 33. When resistance 3903 is normally shunted by the normally closed contacts 3902, the current flowing to the field winding 3904 is higher than when resistance is in series with the result that motor 33 is made to operate at a higher speed as long as contacts 3902 remain open. These contacts remain open for a short, predetermined period of time, relay 3901 being a time delay relay (fast closing, slow opening) in order momentarily to speed up conveyor 12 and in this manner establish a gap between two cut ends of the ribbon i.e. the trailing and the leading ends of ribbon 16 at the point of the complete cut. In this manner, one series of interconnected slabs, or a strand of slabs, which are joined to each other by means of the bendable portions 254 and 255, becomes separated from the succeeding strand of slabs. Such separation of strands is desirable for proper operation of the stacker. The created gap between the succeeding strands is used in the stacker as a time interval for replacing filled pallet with an empty pallet.

Such separation of each strand of slabs from each other and the resulting time delay in the sequence of operation of the photoelectric cells 401 and 403, is used for the operation of the chute plates 3700 and 3701, and also for proper operation of motor 620 and its conveyor 13. As described previously in connection with the description of FIGURE 40, motor 620 becomes energized for a predetermined period of time when the entire strand of slabs becomes deposited on a pallet 3741 in FIGURES 37 and 12, and light beam 800 again shines on photoelectric cell 401, while the light beam 803 is still interrupted. At this point, the circuit of motor 620 becomes energized in the manner described previously in connection with description of FIGURE 40, and motor 620 remains energized until it moves pallet 301 out of its position in stacker 15 and places the next succeeding pallet 300 onto the stacker. When this takes place, motor 610 in FIGURE 6 actuates micro-switch 413, and micro-switch 413 deenergizes motor 620, whereupon the entire stacking system is again ready for the next automatic cutting and stacking cycle.

The above concludes the description of the structure and of the functioning of the automatic stacking system. It should be mentioned herein conclusion that rollers 19 and 20 have been described and illustrated as being slightly distorted cylinders which are also provided with substantially semicircular elements 2511, 2512, 2513 and 2514 appearing in cross section in FIG. 25. These substantially semi-circular bands increase the weight of the rollers. This weight in turn enables one to store more kinetic energy in each roller during that period of time when the knife in each roller is not cutting ribbon 16, and then use this stored kinetic energy during that interval of time when the knife of the roller is cutting the ribbon. Stated simply, the roller thus acts as a fly wheel having sufficiently large mass and a moment of inertia with the result that a smaller motor may be used for operating the cutter and conveyors 10 and 11. This motor is motor 18 in FIG. 1. Since arcuate members 2511 through 2514 do not perform any other useful function, it is obvious that they can be eliminated altogether in which case reasonably large weight should be given to members 222, 223, 224 and 225 so that they could act as fly wheels of sufficient mass for the upper and lower knives 211 and 210. The word "roller" as used in this specification and the succeeding claims, therefore, should be interpreted to define the two possible structures of the rotatable members which hold knives 211 and 210.

What is claimed as new is:

1. An automatic stacking system including a cutter, a stacker, a plurality of conveyors servicing and operatively interconnecting said cutter and said stacker including a first conveyor for feeding continuous ribbon of material into said cutter, a common motor driving said cutter and said conveyor, said cutter including means for making a selectable number of upper and lower partial cuts in said ribbon and a complete cut in said ribbon upon making said selectable number of partial cuts for producing a strand of interconnected slabs of said ribbon; said stacker including first means for stacking said partially cut ribbon in a zig-zag, or accordion-like, manner in a vertical column; said conveyor means also including stacker conveyor; and a control system for operating said cutter, said plurality of conveyors and said stacker conveyor, said control system having means for operating said stacker conveyor upon the completion of the stacking operation by said stacker on said strand.

2. The automtic stacker as defined in claim 1 in which said cutter includes an upper roller and a lower roller, a first cutting knife fixedly mounted in the upper roller, a second cutting knife fixedly mounted in the lower roller, said first and second knives being separated from each other on the peripheries of the respective rollers by approximately 180°; automatic means for lowering and raising said upper roller; said first and second knives and their respective rollers being normally positioned so as to produce said partial upper and lower cuts in said ribbon, and automatically operated control means for lowering said upper roller towards said lower roller for making said complete cut in said ribbon upon the completion of said selectable number of said partial cuts.

3. The automatic stacking system as defined in claim 2 which includes a main conveyor positioned between said cutter and said stacker; a motor for said main conveyor, said control means also including means for operating said main conveyor motor and said main conveyor at a constant low speed when said cutter is making partial cuts and for operating said main conveyor motor and said main conveyor at an accelerated speed for a predetermined period of time shortly after said cutter makes a complete cut in said ribbon.

4. The automatic stacking system as defined in claim 1 in which said stacker includes first and second vertical, adjacent side walls at substantially right angles with respect to each other; and means for simultaneously oscillating said side walls in two opposite directions, one direction being toward the center of the column of said slabs and the second direction being away from said center.

5. The automatic stacking system as defined in claim 4 in which said stacker also includes first and second sliding chute plates, the upper end of said first plate being hingedly mounted on the upper end of said first side wall; said second chute plate being in sliding engagement with respect to the lower end of the first chute plate, and electro-mechanical control means for holding said first and second chute plates in an extended and slanted position at the time the leading end of said strand begins to slide down, toward the bottom of the second chute plate; said electro-mechanical control means also including means for sliding said second chute plate upwardly along the first chute plate and simultaneously rotating the first and second chute plates into a substantially vertical position coinciding with the first side wall of said stacker after said leading end projects beyond the bottom end of the second plate.

6. The automatic stacking system as defined in claim 5 which also includes a stacker conveyor; a motor for said stacker conveyor, and additional means in said electro-mechanical control system for operating the motor of said stacker conveyor for a pre-determined period of time immediately upon the completion of the stacking operation by said stacker on said strand of slabs cut off from said ribbon.

7. An automatic stacking system including first, second, third and fourth conveyors, a rotary cutter positioned between said first and second conveyors; an automatic stacker positioned between said third and fourth conveyors; a first motor for operating said first and second conveyors and said cutter at a constant common speed; a second direct current, variable speed motor for operating said third conveyor; a third motor for operating said stacker; a fourth motor for operating said fourth conveyor; said cutter having first and second cutting means for producing upper and lower cuts in a ribbon fed into said cutter by said first conveyor; first control means for said cutter for raising and lowering said first cutting means for first producing a pre-determined, selectable number of partial upper and lower cuts in said ribbon upon raising of said first cutting means and a single complete cut in said ribbon upon automatic lowering of said first cutting means, thereby producing a series of strands, said strands being separated from each other, each strand being composed of interconnected slabs from said ribbon; said first control means having also additional means for operating said second motor at a constant speed as long as said cutter is making said partial cuts, and at an accelerated speed for a fixed period of time shortly after said cutter makes said complete cut; said stacker including two adjacent substantially vertical side walls, and mechanical means interconnecting said side walls and said third motor, said third motor normally oscillating said side walls toward the center of a column of stacked up slabs produced by said stacker from each strand of said slabs.

8. The automatic stacking system as defined in claim 7 in which said first and second cutting means include first and second rotary cutting knives revolving around respective first and second axes of rotation, said axes being parallel to each other and lying in a first vertical common plane, said first plane forming a small angle with the second vertical plane perpendicular to the longitudinal axes of the first and second conveyors.

9. The automatic stacking system as defined in claim 8 in which said small angle is in the order of from 1° to 3°, the magnitude of said angle being a function of the thickness of said ribbon.

10. The automatic stacking system as defined in claim 8 in which the longitudinal axes of the first and second knives form a small angle with the first vertical plane, said angle being in the order of from 5 to 10 minutes.

11. An automatic stacking system including a first conveyor carrying a plurality of spaced from each other strands of interconnected slabs of flexible material, said material having transverse partial cuts in said material, a second conveyor carrying a plurality of pallets, a motor for said second conveyor, a chute for initially guiding a leading edge of a strand from said first conveyor to its proper place on a first pallet resting on said second conveyor, two oscillating, vertical and adjacent to each other side walls for making a substantially vertical column from superimposed upon each other slabs of any given strand being deposited on the first pallet in a zig-zag, or accordion-like manner, and a control means for said chute and said motor; said control means having first means for rotating said chute into a plane of one of the side walls after depositing the first slab in a proper position on said first pallet, and second means for operating said motor for a predetermined period of time for removing the fully loaded first pallet and placing a succeeding second pallet in proper relationship with respect to said side walls for receiving the succeeding strand of said material.

12. An automatic stacking system comprising a first conveyor carrying a continuous ribbon of pliable material, a rotary cutter having top and bottom rotary cutting knives for producing a predetermined number of top and bottom partial cuts in said ribbon; said cuts being straight line, slightly diagonal cuts extending transversely from edge-to-edge of said ribbon for transforming said ribbon into a series of interconnected slabs of said material, the knives being spaced with respect to each other to produce one slab of a slightly greater length than the next, succeeding slab; means for advancing one of said knives toward said ribbon for making a single complete transverse cut upon the completion of said predetermined number of partial cuts for producing discrete strands of said interconnected slabs; and means for automatically stacking each of said strands on individual pallets in an accordion-like, or zig-zag manner.

13. The automatic stacking system as defined in claim 12 in which said means for automatically stacking each of said strands includes a conveyor, a plurality of pallets deposited on said conveyor, two vertical side-walls forming an angle member, rollers for slidingly supporting said angle member, a motor for oscillating said angle member back and forth, said angle member shifting the slabs normally leaning toward said angle member while said slabs being stacked up in an accordion-like, or zig-zag manner on top of a pallet aligned with said angle member with the aid of said conveyor into a substantially vertical column of said slabs.

14. The automatic stacking system as defined in claim 12 in which said angle member also includes a chute and control means for said chute, said control means holding said chute in a slanted position for guiding the first slab to its proper position on said pallet and then aligning said chute with the adjacent side-wall upon depositing of said first slab on said pallet.

15. The automatic stacking system as defined in claim 14 in which said control means also includes a photoelectric cell and a source of light for actuating said cell when said strand and its last slab leaves the light-beam produced by said source of light, thereby re-energizing said photo-electric cell, and a relay control system for actuating said conveyor motor for a predetermined length of time for sliding away a fully loaded pallet along said conveyor and for sliding an empty pallet into the proper position with respect to said angle member for receiving the next strand of slabs produced from said ribbon by said rotary cutter.

References Cited in the file of this patent
UNITED STATES PATENTS

| | | |
|---|---|---|
| 223,475 | Brombacher | Jan. 13, 1880 |
| 1,263,885 | Guttridge | Apr. 23, 1918 |
| 1,365,947 | Overbury | Jan. 18, 1921 |
| 1,541,201 | Wennerblad | June 9, 1925 |